(12) United States Patent
Muto et al.

(10) Patent No.: US 11,473,477 B2
(45) Date of Patent: *Oct. 18, 2022

(54) CATALYST DETERIORATION DETECTION DEVICE, CATALYST DETERIORATION DETECTION SYSTEM, DATA ANALYSIS DEVICE, CONTROL DEVICE OF INTERNAL COMBUSTION ENGINE, AND METHOD FOR PROVIDING STATE INFORMATION OF USED VEHICLE

(71) Applicant: TOYOTA JIDOSHA KABUSHIKI KAISHA, Toyota (JP)

(72) Inventors: Harufumi Muto, Miyoshi (JP); Haruki Oguri, Toyota (JP); Akihiro Katayama, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,692

(22) Filed: Sep. 16, 2021

(65) Prior Publication Data

US 2022/0003142 A1 Jan. 6, 2022

Related U.S. Application Data

(63) Continuation of application No. 16/778,518, filed on Jan. 31, 2020, now Pat. No. 11,149,618.

(30) Foreign Application Priority Data

Feb. 18, 2019 (JP) .............................. JP2019-026614

(51) Int. Cl.
*F01N 11/00* (2006.01)
*F01N 9/00* (2006.01)

(52) U.S. Cl.
CPC ............ *F01N 11/007* (2013.01); *F01N 9/007* (2013.01); *F01N 2550/02* (2013.01);
(Continued)

(58) Field of Classification Search
CPC ..... F02D 41/0025; F02D 41/22; F02M 25/06; F01M 11/10; F01M 13/011
See application file for complete search history.

(56) References Cited

U.S. PATENT DOCUMENTS 5,088,281 A * 2/1992 Izutani .................. F01N 11/007
60/276
5,625,750 A 4/1997 Puskorius et al.
2009/0171549 A1 7/2009 Hyde et al.

FOREIGN PATENT DOCUMENTS

DE 100 10 745 A1 3/2002
JP H10-252451 A 9/1998
(Continued)

OTHER PUBLICATIONS

Non-Final Office Action dated Oct. 28, 2020 in U.S. Appl. No. 16/778,518; 13 pgs.
(Continued)

*Primary Examiner* — Kevin A Lathers
(74) *Attorney, Agent, or Firm* — Oblon, McClelland, Maier & Neustadt, L.L.P.

(57) ABSTRACT

A catalyst deterioration detection device is provided to detect deterioration of a catalyst provided in an exhaust passage of an internal combustion engine. The catalyst deterioration detection device includes a storage device and processing circuitry. The storage device stores map data specifying a mapping that uses time series data of an excess amount variable in a first predetermined period and time series data of a downstream detection variable in a second predetermined period as inputs to output a deterioration level variable. The processing circuitry executes an acqui-
(Continued)

sition process that acquires data, a deterioration level variable calculation process that calculates a deterioration level variable of the catalyst based on an output of the mapping using the data acquired by the acquisition process as an input. The map data includes data that is learned through machine learning.

16 Claims, 14 Drawing Sheets

(52) U.S. Cl.
CPC ............... *F01N 2900/0402* (2013.01); *F01N 2900/0418* (2013.01); *F01N 2900/0601* (2013.01); *F01N 2900/1402* (2013.01); *F01N 2900/1624* (2013.01)

(56) References Cited

FOREIGN PATENT DOCUMENTS

| JP | H10-252536 A | | 9/1998 | |
|---|---|---|---|---|
| JP | H10252451 A | * | 9/1998 | ............. Y02T 10/40 |
| JP | 2005-50022 A | | 2/2005 | |
| JP | 2012-117406 A | | 6/2012 | |

OTHER PUBLICATIONS

Final Office Action dated May 25, 2021 in U.S. Appl. No. 16/778,518; 6 pgs.
Notice of Allowance dated Aug. 4, 2021 in U.S. Appl. No. 16/778,518; 9 pgs.

* cited by examiner

CATALYST DETERIORATION DETECTION DEVICE, CATALYST DETERIORATION DETECTION SYSTEM, DATA ANALYSIS DEVICE, CONTROL DEVICE OF INTERNAL COMBUSTION ENGINE, AND METHOD FOR PROVIDING STATE INFORMATION OF USED VEHICLE

CROSS-REFERENCE TO RELATED APPLICATIONS

This application is a continuation application of U.S. application Ser. No. 16/778,518, filed Jan. 31, 2020, which is in turn based upon and claims the benefit of priority from Japanese Patent Application No. 2019-026614, filed on Feb. 18, 2019, the entire contents of each of which are incorporated herein by reference.

BACKGROUND

1. Field

The following description relates to a catalyst deterioration detection device for a catalyst provided in an exhaust passage of an internal combustion engine, a catalyst deterioration detection system, a data analysis device, a control device of an internal combustion engine, and a method for providing state information of a used vehicle.

2. Description of Related Art

Japanese Laid-Open Patent Publication No. 2012-117406 discloses an example of a device that intentionally controls the air-fuel ratio of a mixture that is burned in a combustion chamber to obtain a lean air-fuel ratio so that the oxygen storage amount of a catalyst is maximized. After maximizing the oxygen storage amount of the catalyst, the device intentionally controls the air-fuel ratio of the mixture to obtain a rich air-fuel ratio. When the air-fuel ratio of the mixture is intentionally controlled to the rich air-fuel ratio, the device obtains a detection value of an air-fuel ratio sensor provided downstream of the catalyst. The device detects that the oxygen storage amount of the catalyst becomes zero based on the acquired detection value of the air-fuel ratio sensor to calculate the maximum value of the oxygen storage amount of the catalyst. Since the maximum value of the oxygen storage amount decreases due to the deterioration of the catalyst over time, the maximum value indicates the deterioration level of the catalyst.

In the device described above, in order to detect the deterioration level of the catalyst, the air-fuel ratio of the mixture is deviated from a value appropriate to exhaust purification control. This may extend a period of time in which the air-fuel ratio of the mixture is deviated from the appropriate value or may increase the amount of deviation of the air-fuel ratio of the mixture from the appropriate value. As a result, deviation of the composition amount of a fluid flowing into the catalyst from a composition amount that is appropriate to the purification performance of the catalyst may accumulate, and the accumulated amount of deviation may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, a plurality of aspects and effects of the present disclosure will be described.

Aspect 1. A catalyst deterioration detection device configured to detect a deterioration of a catalyst provided in an exhaust passage of an internal combustion engine is provided. The catalyst deterioration detection device includes a storage device and processing circuitry. The storage device stores map data. The map data specifies a mapping that uses time series data of an excess amount variable in a first predetermined period and time series data of a downstream detection variable in a second predetermined period as inputs to output a deterioration level variable. An amount of fuel that reacts with oxygen contained in a fluid flowing into the catalyst without excess or deficiency is an ideal fuel amount. The excess amount variable is a variable that corresponds to an excess amount of an actual fuel flowing into the catalyst in relation to the ideal fuel amount. The downstream detection variable is a variable that corresponds to a detection value of an air-fuel ratio sensor provided downstream of the catalyst. The deterioration level variable is a variable related to a deterioration level of the catalyst. The processing circuitry is configured to execute an acquisition process that acquires the time series data of the excess amount variable in the first predetermined period and the time series data of the downstream detection variable in the second predetermined period, a deterioration level variable calculation process that calculates the deterioration level variable of the catalyst based on an output of the mapping using the data acquired by the acquisition process as an input, and a dealing process that operates a predetermined hardware when the deterioration level of the catalyst is greater than or equal to a predetermined level based on a calculation result of the deterioration level variable calculation process in response to a situation in which the deterioration level of the catalyst is greater than or equal to the predetermined level. The map data includes data that is learned through machine learning.

In the configuration described above, the deterioration level variable is calculated by the mapping that uses the time series data of the excess amount variable and the time series data of the downstream detection variable as inputs. The excess amount variable refers to an excess amount of an actual fuel in relation to an amount of fuel that reacts with oxygen without excess or deficiency. When the actual fuel amount is deficient, the excess amount variable has a negative value. Since the time series data of the excess amount variable allows for obtainment of information regarding oxygen and fuel flowing into the catalyst, and the time series data of the downstream detection variable allows for obtainment of information regarding oxygen and unburned fuel flowing downstream of the catalyst, it is possible to obtain information on the maximum value of the oxygen storage amount of the catalyst. Furthermore, it is possible to obtain information regarding the deterioration level of the catalyst. In addition, since the above-described time series data is used, the air-fuel ratio of the mixture does not necessarily have to be deviated from a value that is appropriate for exhaust purification control. Even when the air-fuel ratio of the mixture is deviated from the appropriate value, the period of time in which the air-fuel ratio of the mixture is deviated from the proper value may be shortened, and the amount of deviation of the air-fuel ratio of the mixture from the appropriate value may be decreased. This reduces an accumulated amount of deviation of the composition amount of the fluid flowing into the catalyst from the composition amount that is appropriate to the purification performance of the catalyst. Moreover, in the configuration described above, the map data is learned through machine learning. Thus, the number of man-hours for associating the time series data of the excess amount variable and the time series data of the downstream detection variable with the deterioration level variable are reduced as compared to a case in which the adaptation is performed by humans.

Aspect 2. In the catalyst deterioration detection device according to aspect 1, the time series data in the second predetermined period includes values of the downstream detection variable that correspond to three or more different points in time.

Aspect 3. In the catalyst deterioration detection device according to aspect 1 or 2, an input to the mapping includes a temperature of the catalyst, the acquisition process includes a process that acquires the temperature of the catalyst, and the deterioration level variable calculation process includes a process that calculates the deterioration level variable of the catalyst based on an output of the mapping that uses the temperature of the catalyst as an input.

The maximum value of the oxygen storage amount of the catalyst changes in accordance with the temperature of the catalyst. In the configuration described above, the input to the mapping includes the temperature of the catalyst. Thus, the deterioration level variable is calculated with high accuracy while determining whether the oxygen storage amount of the catalyst is reduced due to the deterioration or due to the temperature.

Aspect 4. In the catalyst deterioration detection device according to any one of aspects 1 to 3, the excess amount variable includes a variable that corresponds to a detection value of an air-fuel ratio sensor provided upstream of the catalyst.

In the configuration described above, the excess amount variable includes a variable related to a detection value of the upstream air-fuel ratio sensor. Thus, a period of time that is taken for the excess amount variable to affect a detection value of the downstream air-fuel ratio sensor is shortened as compared to a case in which only the amounts of fuel and air that are provided for combustion in a combustion chamber are used as the excess amount variables. In other words, the configuration described above shortens a period of time from when the value of the excess amount variable is acquired to when the effect corresponding to the acquired value of the excess amount variable appears in the detection value of the downstream air-fuel ratio sensor. For this reason, the number of pieces of time series data is readily reduced as compared to a case in which only the amounts of fuel and air that are provided for combustion in the combustion chamber are used as the excess amount variables.

Aspect 5. In the catalyst deterioration detection device according to any one of aspects 1 to 4, the map data is one of different kinds of map data, and the storage device includes the different kinds of map data, and the deterioration level variable calculation process includes a selection process that selects the map data from the different kinds of map data, the map data being used to calculate the deterioration level variable of the catalyst.

If a single mapping is configured to be capable of outputting the deterioration level variable in various situations with high accuracy, the structure of the mapping becomes more complicated. In this regard, the configuration described above includes different kinds of map data. Thus, an appropriate mapping is selected depending on each situation. When different kinds of map data are provided, the structure of each of different kinds of mappings is simplified as compared to the structure of a single mapping in a case in which only the single mapping is provided.

Aspect 6. In the catalyst deterioration detection device according to aspect 5, the different kinds of map data include data for each of areas that are divided based on a flow rate of the fluid flowing into the catalyst, and the selection process includes a process that selects the map data used to calculate the deterioration level variable of the catalyst based on the flow rate.

Even when the air-fuel ratio of the mixture that is burned in a combustion chamber is the same, the excess amount of the actual fuel in relation to the amount of fuel that reacts with oxygen contained in the fluid flowing into the catalyst without excess or deficiency may widely change depending on the level of the flow rate of the fluid flowing into the catalyst. Consequently, the oxygen storage amount of the catalyst may widely change per unit time. For this reason, the flow rate of the fluid flowing into the catalyst may significantly affect the time series data of the downstream detection variable. For this reason, if a single map data is used regardless of whether the flow rate of the fluid flowing into the catalyst is large or small, the behavior of the time series data of the downstream detection variable, which changes in accordance with the flow rate of the fluid, may need to be learned. As a result, in a case in which a single map data is used regardless of whether the flow rate of the fluid flowing into the catalyst is large or small, the structure of the mapping becomes more complicated. In this regard, in the configuration described above, different map data are used for each level of the flow rate of the fluid flowing into the catalyst. Thus, the structure of the mapping is simplified.

Aspect 7. In the catalyst deterioration detection device according to aspect 5, the different kinds of map data include data for each of areas that are divided based on a temperature of the catalyst, and the selection process includes a process that selects the map data used to calculate the deterioration level of the catalyst based on the temperature of the catalyst.

Since the maximum value of the oxygen storage amount of a catalyst changes in accordance with the temperature of the catalyst, even when catalysts have the same catalyst deterioration level, if the catalysts have different temperatures, the behavior of the time series data of the downstream detection variable differs between the catalysts. In other words, when the deterioration level of a first catalyst is the same as the deterioration level of a second catalyst and the temperature of the first catalyst differs from the temperature of the second catalyst, the behavior of the time series data of the downstream detection variable corresponding to the first catalyst differs from the behavior of the time series data of the downstream detection variable corresponding to the second catalyst. For this reason, if the temperature-dependent differences in the behavior of the time series data of the downstream detection variable are configured to be distinguished, the structure of the mapping becomes more complicated. In this regard, in the configuration described above, different pieces map data are used for each temperature of the catalyst. Thus, the structure of the mapping is simplified.

Aspect 8. In the catalyst deterioration detection device according to aspect 5, the different kinds of map data include different pieces of data corresponding to whether a fuel cutoff process is being executed, and the selection process includes a process that selects the map data in accordance with whether or not the fuel cutoff process is being executed.

When the fuel cutoff process is being executed, a large amount of oxygen flows into the catalyst. For this reason, the behavior of the time series data of the downstream detection variable greatly differs depending on whether or not the fuel cutoff process is being executed. Regardless of the difference, if the deterioration level variable is calculated by a single map data, the structure of the mapping becomes more complicated. In this regard, in the configuration described above, different map data are used in accordance with whether or not the fuel cutoff process is being executed. Thus, the structure of the mapping is simplified.

Aspect 9. In the catalyst deterioration detection device according to any one of aspects 1 to 5, the acquisition process includes a process that acquires a variable that is used as an input to the mapping when a predetermined condition is satisfied, and the predetermined condition includes a condition indicating that a flow rate of the fluid flowing into the catalyst is within a predetermined range.

Even when the air-fuel ratio of the mixture that is burned in a combustion chamber is the same, the excess amount of the actual fuel in relation to the amount of fuel that reacts with oxygen contained in the fluid flowing into the catalyst without excess or deficiency greatly changes depending on the level of the flow rate of the fluid flowing into the catalyst. Consequently, the oxygen storage amount of the catalyst widely changes per unit time depending on the level of the flow rate of the fluid flowing into the catalyst. For this reason, the flow rate of the fluid flowing into the catalyst may significantly affect the time series data of the downstream detection variable. For this reason, if a single map data is used regardless of whether the flow rate of the fluid flowing into the catalyst is large or small, the behavior of the time series data of the downstream detection variable, which changes in accordance with the flow rate of the fluid, needs to be learned. Thus, the structure of the mapping becomes more complicated. In this regard, in the configuration described above, a sampling value corresponding to when the flow rate of the fluid flowing into the catalyst is within the predetermined range is used. Thus, the mapping is specialized in a case in which the flow rate is within the predetermined range, and thus, the structure of the mapping is simplified. In other words, the deterioration level variable of the catalyst is calculated based on the sampling value that is acquired when the flow rate of the fluid flowing into the catalyst is within the predetermined range. Thus, the structure of the mapping is simplified as compared to a configuration in which the deterioration level variable of the catalyst is calculated regardless of the flow rate of the fluid flowing into the catalyst.

Aspect 10. In the catalyst deterioration detection device according to any one of aspects 1 to 5, the acquisition process includes a process that acquires a variable that is used as an input to the mapping when a predetermined condition is satisfied, and the predetermined condition includes a condition indicating that a temperature of the catalyst is within a predetermined range.

Since the maximum value of the oxygen storage amount of a catalyst changes in accordance with the temperature of the catalyst, even when catalysts have the same catalyst deterioration level, if the catalysts have different temperatures, the behavior of the time series data of the downstream detection variable differs between the catalysts. For this reason, if the temperature-dependent differences in the behavior of the time series data of the downstream detection variable are configured to be distinguished, the structure of the mapping becomes more complicated. In this regard, in the configuration described above, a sampling value corresponding to when the temperature of the catalyst is within the predetermined range is used. Thus, the structure of the mapping is simplified.

Aspect 11. In the catalyst deterioration detection device according to any one of aspects 1 to 5, the acquisition process includes a process that acquires a variable that is used as an input to the mapping in synchronization with a point in time at which a predetermined condition is satisfied, and the predetermined condition is a condition indicating that an amount of oxygen stored in the catalyst corresponds to a maximum value or a minimum value.

The behavior of the time series data of the downstream detection variable changes depending on the oxygen storage amount. As a result, the behavior of the time series data of the downstream detection variable differs depending on the oxygen storage amount corresponding to when the oldest downstream detection variable was acquired among the time series data of the downstream detection variables. For this reason, if a single mapping is used regardless of the oxygen storage amount corresponding to when the oldest downstream detection variable was acquired among the time series data of the downstream detection variables, the structure of the mapping becomes more complicated. In this regard, in the configuration described above, sampling is performed in synchronization with a point in time at which the oxygen storage amount reaches the maximum value or the minimum value. This allows for determination of a situation in which the time series data is acquired. As a result, the structure of the mapping is simplified. Moreover, the time series data of the downstream detection variable is used as an input. This limits or eliminates the need for waiting until a large amount of oxygen or unburned fuel flows downstream of the catalyst in order to clearly determine a point in time at which the oxygen storage amount of the catalyst is switched from the maximum value to zero or from zero to the maximum value.

Aspect 12. In the catalyst deterioration detection device according to any one of aspects 1 to 11, the dealing process includes a limiting process that limits an amount of unburned fuel flowing into the catalyst to a reduced amount.

When the deterioration level is high and a large amount of unburned fuel flows into the catalyst, it is difficult to sufficiently oxidize the unburned fuel with oxygen in the catalyst. This may result in an increase in the amount of unburned fuel flowing downstream of the catalyst. In this regard, in the configuration described above, when the deterioration level is higher than or equal to a predetermined level, the amount of unburned fuel flowing downstream of the catalyst is limited to a reduced amount. This limits an increase in the amount of unburned fuel flowing downstream of the catalyst.

Aspect 13. A catalyst deterioration detection system includes the processing circuitry and the storage device according to any one of aspects 1 to 11. The deterioration level variable calculation process includes an oxygen storage amount calculation process that uses at least a part of the map data to calculate a value corresponding to a maximum value of an oxygen storage amount of the catalyst. The processing circuitry includes a first execution device and a second execution device. The first execution device is installed in a vehicle and is configured to execute the acquisition process, a vehicle side transmission process that transmits data acquired by the acquisition process to an outside of the vehicle, a vehicle side reception process that receives a signal based on a calculation result of the oxygen storage amount calculation process, and the dealing process. The second execution device is disposed outside the vehicle and is configured to execute an outside reception process that receives data transmitted by the vehicle side transmission process, the oxygen storage amount calculation process, and an outside transmission process that transmits a signal based on a calculation result of the oxygen storage amount calculation process to the vehicle.

In the configuration described above, the oxygen storage amount calculation process is executed outside the vehicle. This reduces the computational load of on-board devices.

Aspect 14. A data analysis device includes the second execution device and the storage device according to aspect 13.

Aspect 15. A control device of an internal combustion engine, the control device includes the first execution device according to aspect 13.

Aspect 16. A method is for providing state information of a used vehicle on which an internal combustion engine is mounted. The internal combustion engine is provided with a catalyst provided in an exhaust passage. The method causes a computer to execute the acquisition process and the deterioration level variable calculation process according to any one of aspects 1 to 11, a storage process that stores a calculation result of the deterioration level variable calculation process together with a vehicle ID in a storage device, and an output process that outputs deterioration level information of the catalyst corresponding to the vehicle ID in response to an access from outside.

The deterioration level of the catalyst is useful information in determining how much it would cost, for example, to repair a used vehicle after the vehicle is purchased. In the method described above, the calculation result of the deterioration level of the catalyst is stored together with the vehicle ID, and the information regarding the deterioration level is output in response to an access from outside. This provides useful information regarding the state of the used vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of a catalyst deterioration detection device will be described with reference to the drawings.

Figure 1:
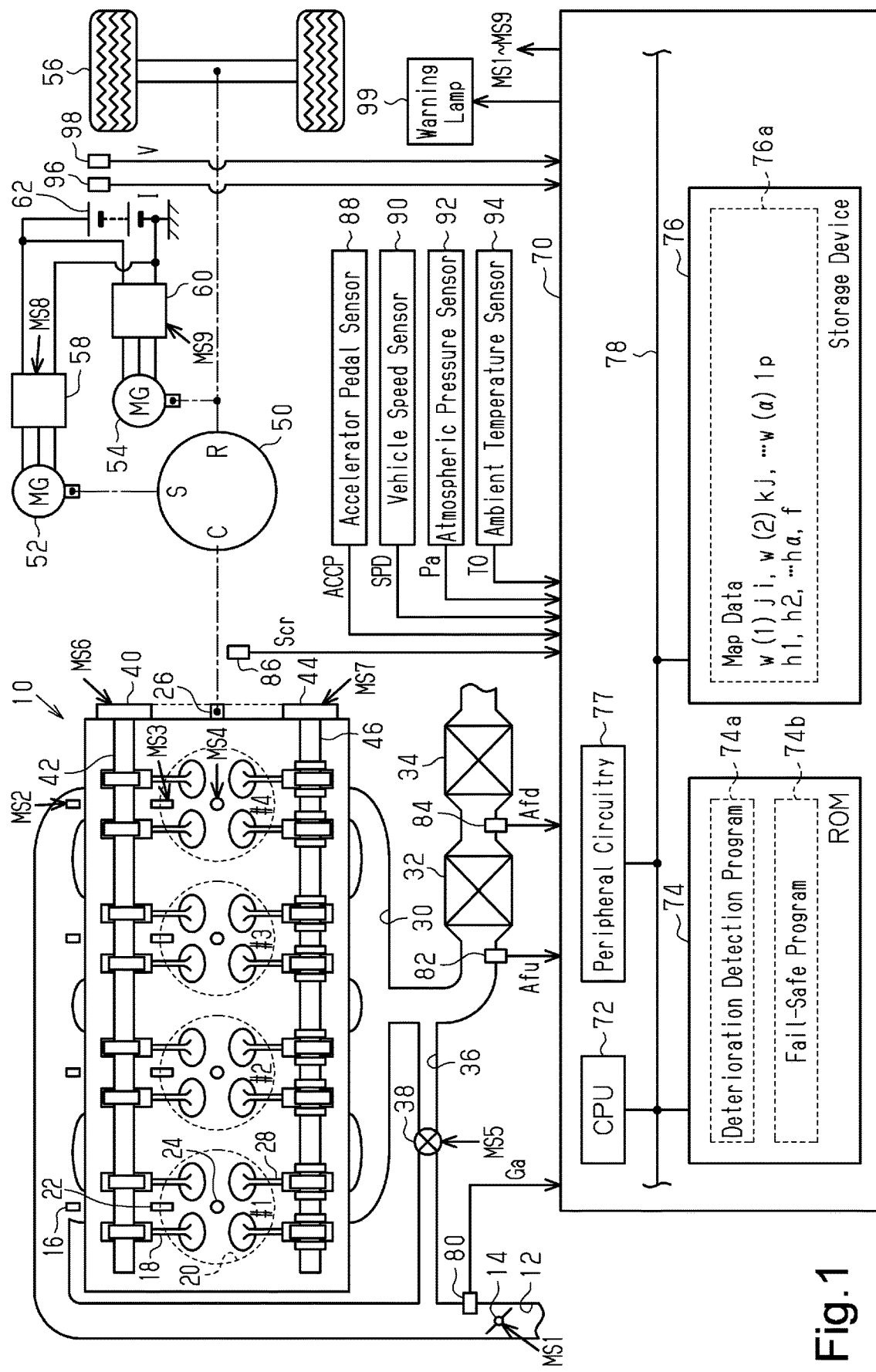
FIG. 1 is a view illustrating the configuration of a control device and a drive system of a vehicle according to a first embodiment.

In an internal combustion engine 10 installed in a vehicle VC illustrated in FIG. 1, a throttle valve 14 is provided in an intake passage 12, and port injection valves 16 are provided downstream of the throttle valve 14. As intake valves 18 open, air that is drawn from the intake passage 12 and fuel injected from the port injection valves 16 flow into combustion chambers 20. The internal combustion engine 10 is provided with in-cylinder injection valves 22, which directly inject fuel into the combustion chambers 20, and ignition devices 24 that generate spark discharges. A mixture of air and fuel is provided for combustion in the combustion chambers 20, and energy generated by the combustion is output as rotational energy of a crankshaft 26. As exhaust valves 28 open, the mixture provided for the combustion is discharged to an exhaust passage 30 as exhaust. The exhaust passage 30 is provided with an upstream catalyst 32, which is a three-way catalyst and is capable of storing oxygen, and a downstream catalyst 34 which is a three-way catalyst and is capable of storing oxygen. The exhaust passage 30 is connected to the intake passage 12 via an exhaust gas recirculation (EGR) passage 36. The EGR passage 36 is provided with an EGR valve 38 that regulates the flow path cross-sectional area of the EGR passage 36.

The rotational power of the crankshaft 26 is transmitted to an intake camshaft 42 via an intake variable valve timing device 40. The rotational power of the crankshaft 26 is also transmitted to an exhaust camshaft 46 via an exhaust variable valve timing device 44. The intake variable valve timing device 40 changes a relative rotational phase difference between the intake camshaft 42 and the crankshaft 26. The exhaust variable valve timing device 44 changes a relative rotational phase difference between the exhaust camshaft 46 and the crankshaft 26.

The crankshaft 26 of the internal combustion engine 10 is mechanically coupled to a carrier C of a planetary gear mechanism 50, which configures a power split mechanism. The planetary gear mechanism 50 includes a sun gear S that is mechanically coupled to a rotary shaft of a motor-generator (MG) 52. The planetary gear mechanism 50 includes a ring gear R that is mechanically coupled to a rotary shaft of a motor-generator 54 and drive wheels 56. Voltage is applied from a battery 62 to each terminal of the motor-generator 52 via an inverter 58. Voltage is applied from the battery 62 to each terminal of the motor-generator 54 via an inverter 60.

The internal combustion engine 10 is controlled by a control device 70. The control device 70 operates operation units such as the throttle valve 14, the port injection valve 16, the in-cylinder injection valve 22, the ignition device 24, the EGR valve 38, the intake variable valve timing device 40, and the exhaust variable valve timing device 44 to control the control variables of the internal combustion engine 10 such as the torque and the exhaust composition ratio. The control device 70 also controls the motor-generator 52 and operates the inverter 58 to control the torque and the rotational speed, which are control variables of the motor-generator 52. The control device 70 also controls the motor-generator 54 and operates the inverter 60 to control the torque and the rotational speed, which are control variables of the motor-generator 54. FIG. 1 shows operation signals MS1 to MS9 of the throttle valve 14, the port injection valve 16, the in-cylinder injection valve 22, the ignition device 24, the EGR valve 38, the intake variable valve timing device 40, the exhaust variable valve timing device 44, and the inverters 58 and 60 respectively.

When the control device 70 controls the control variables, the control device 70 refers to an intake air amount Ga detected by an airflow meter 80, an upstream detection value Afu, which is a detection value of an upstream air-fuel ratio sensor 82 provided upstream of the upstream catalyst 32, or a downstream detection value Afd, which is a detection value of a downstream air-fuel ratio sensor 84 provided between the upstream catalyst 32 and the downstream catalyst 34. In addition, the control device 70 refers to an output signal Scr of a crank angle sensor 86, an accelerator pedal operating amount ACCP, which is the amount of depression of an accelerator pedal detected by an accelerator pedal sensor 88, or a vehicle speed SPD detected by a vehicle speed sensor 90. In addition, the control device 70 refers to an atmospheric pressure Pa detected by an atmospheric pressure sensor 92, an ambient temperature TO detected by an ambient temperature sensor 94, a charging-discharging current I of the battery 62 detected by a current sensor 96, and a terminal voltage V of the battery 62 detected by a voltage sensor 98.

The control device 70 includes a CPU 72, a ROM 74, a storage device 76, which is an electrically rewritable nonvolatile memory, and peripheral circuitry 77. These components are configured to communicate with each other through a local network 78. The peripheral circuitry 77 includes, for example, a circuit that generates a clock signal to specify an internal operation, a power supply circuit, and a reset circuit.

The control device 70 controls the above-described control variables through programs stored in the ROM 74 and executed by the CPU 72.

Figure 2:
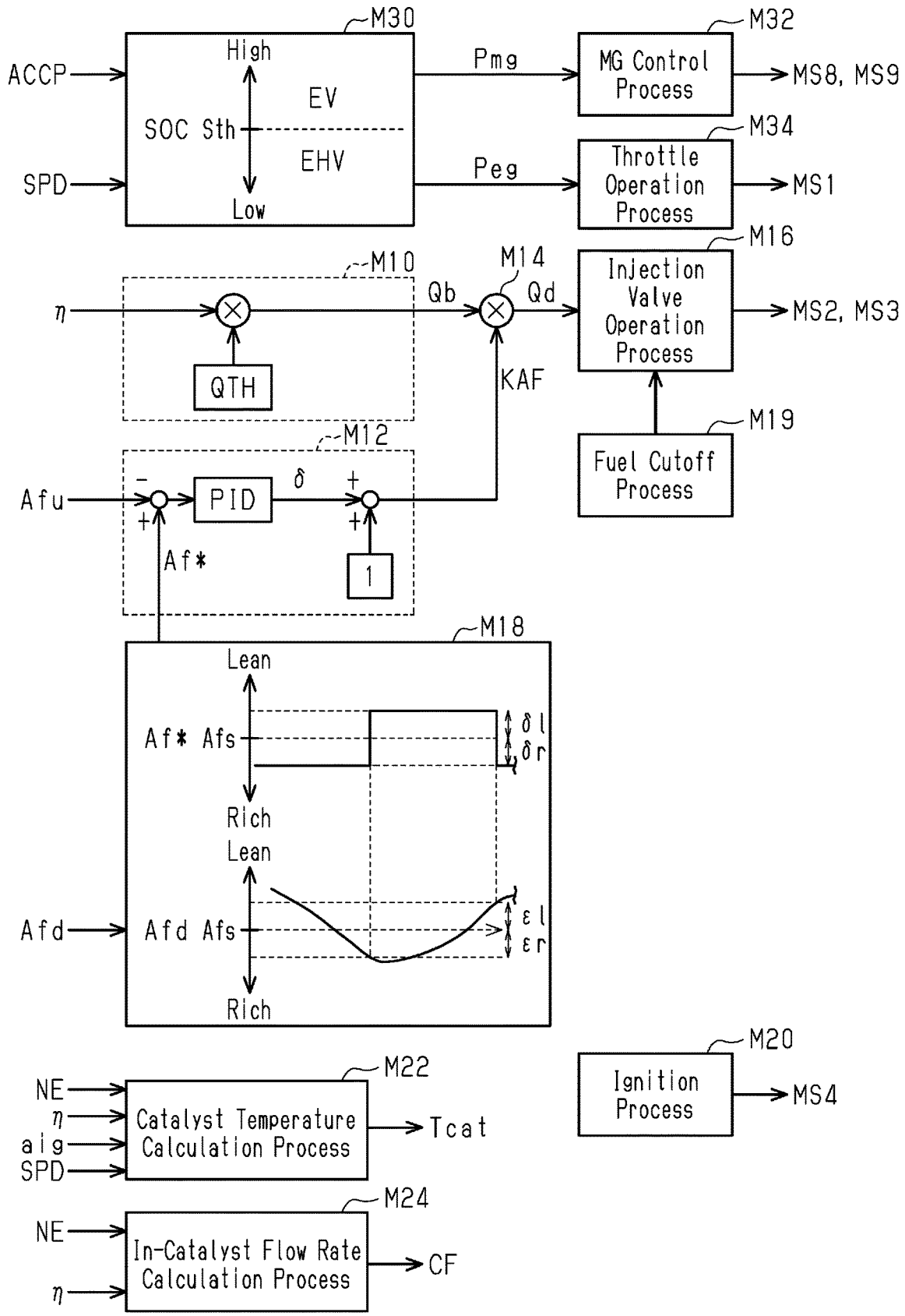
FIG. 2 is a block diagram illustrating some of processes executed by the control device according to the first embodiment.

FIG. 2 illustrates some of the processes implemented by the CPU 72 executing the programs stored in the ROM 74.

A base injection amount calculation process M10 calculates a base injection amount Qb, which is the base value of a fuel amount that sets the air-fuel ratio of the mixture in the combustion chamber 20 to a target air-fuel ratio, based on a charging efficiency η. More specifically, for example, in a case in which the charging efficiency η is expressed as a percentage, the base injection amount calculation process M10 may calculate the base injection amount Qb by multiplying the charging efficiency η by a fuel amount QTH per 1% of the charging efficiency η, which sets the air-fuel ratio to the target air-fuel ratio. The base injection amount Qb is an amount of fuel that is calculated so that the air-fuel ratio is controlled to the target air-fuel ratio based on the amount of air filling the combustion chamber 20. The target air-fuel ratio is a stoichiometric air-fuel ratio. The charging efficiency η is a parameter that determines the amount air filling the combustion chamber 20 and is calculated by the CPU 72 based on a rotational speed NE and the intake air amount Ga. The rotational speed NE is calculated by the CPU 72 based on the output signal Scr of the crank angle sensor 86.

A feedback process M12 calculates and outputs a feedback correction factor KAF by adding one to a correction ratio δ of the base injection amount Qb, which is a feedback operating amount, that is, an operating amount that causes the upstream detection value Afu to be a target value Af* through feedback control. More specifically, the feedback process M12 sets the correction ratio δ to the sum of output values of a proportional control element and a derivative control element, which use the difference between the upstream detection value Afu and the target value Af* as an input, and an output value of an integral control element, which retains and outputs an integrated value of the value corresponding to the differences.

A request injection amount calculation process M14 calculates a request injection amount Qd by multiplying the base injection amount Qb by the feedback correction factor KAF.

An injection valve operation process M16 outputs the operation signal MS2 to the port injection valve 16 and outputs the operation signal MS3 to the in-cylinder injection valve 22 based on the request injection amount Qd to operate the port injection valve 16 and the in-cylinder injection valve 22. More specifically, the injection valve operation process M16 sets an injection division ratio Kp to the ratio of a fuel injection amount of the port injection valve 16 to the request injection amount Qd and operates the port injection valve 16 and the in-cylinder injection valve 22 in accordance with the injection division ratio Kp.

When the downstream detection value Afd is richer than a stoichiometric point Afs, which indicates the stoichiometric air-fuel ratio, by a predetermined amount εr or greater, a sub-feedback process M18 sets the target value Af* to be leaner than the stoichiometric point Afs by a specified amount δl. When the downstream detection value Afd is leaner than the stoichiometric point Afs, which indicates the stoichiometric air-fuel ratio, by a predetermined amount εl or greater, the sub-feedback process M18 sets the target value Af* to be richer than the stoichiometric point Afs by a specified amount δr.

When release of the accelerator pedal is detected based on the accelerator pedal operating amount ACCP and the rotational speed NE is greater than or equal to a predetermined speed, a fuel cutoff process M19 stops the injection of fuel from the port injection valve 16 and the in-cylinder injection valve 22. The injection valve operation process M16 includes a process that performs an increase correction on the request injection amount Qd during a predetermined period from when the process is returned from the fuel cutoff process.

An ignition process M20 outputs the operation signal MS4 to the ignition device 24 to operate an ignition timing aig, which is an operating amount of the ignition device 24. The ignition process M20 includes a process that normally sets a base ignition timing in accordance with the rotational speed NE and the charging efficiency η to set the ignition timing aig based on the base ignition timing. The ignition process M20 includes a process that sets the ignition timing aig based on an ignition timing that is retarded from the base ignition timing by a retard amount Δaig during a warm-up process of the upstream catalyst 32.

A catalyst temperature calculation process M22 calculates a catalyst temperature Tcat, which is the temperature of the upstream catalyst 32, based on the rotational speed NE, the charging efficiency η, the ignition timing aig, and the vehicle speed SPD. More specifically, the catalyst temperature calculation process M22 is implemented in the following manner. When the ROM 74 stores in advance map data that uses the rotational speed NE and the charging efficiency η as input variables and the base temperature as an output variable, the CPU 72 obtains a base temperature through map calculation. Also, when the ROM 74 stores in advance map data that uses the ignition timing aig as an input variable and the ignition timing correction amount, which is the correction amount of the base temperature based on the ignition timing aig, as an output variable, the CPU 72 obtains an ignition timing correction amount through map calculation. When the ROM 74 stores in advance map data that uses the vehicle speed SPD as an input variable and the vehicle speed correction amount, which is the correction amount of the base temperature based on the vehicle speed SPD, as an output variable, the CPU 72 obtains a vehicle speed correction amount through map calculation. Then, the CPU 72 corrects the base temperature using the ignition timing correction amount and the vehicle speed correction amount to calculate the catalyst temperature Tcat.

The map data is a data set of discrete values of an input variable and the value of an output variable corresponding to each value of the input variable. For example, when the value of an input variable matches any one of the values of the input variable in the map data, the map calculation may use the value of the corresponding output variable in the map data as the calculation result. When the value of the input variable does not match any one of the values of the input variable in the map data, the map calculation may use a value that is obtained by interpolating multiple values of the output variable in the map data as the calculation result.

An in-catalyst flow rate calculation process M24 calculates an in-catalyst flow rate CF, which is the volumetric flow rate of a fluid flowing through the upstream catalyst 32, based on the rotational speed NE and the charging efficiency η. More specifically, this process is implemented in the following manner. More specifically, the CPU 72 calculates the mass flow rate of the fluid flowing into the upstream catalyst 32 based on the charging efficiency η and the rotational speed NE. The CPU 72 estimates the pressure and temperature of the fluid flowing into the upstream catalyst 32 based on the rotational speed NE and the charging efficiency η, and converts the mass flow rate into a volumetric flow rate based on the estimated pressure and temperature. Then, the CPU 72 calculates the in-catalyst flow rate CF by converting the converted volumetric flow rate into a volumetric flow rate in the upstream catalyst 32 based on the ratio of the flow path cross-sectional area of the upstream catalyst 32 to the flow path cross-sectional area of the exhaust passage 30 upstream of the upstream catalyst 32.

An output control process M30 calculates an output Peg requested to the motor-generators 52 and 54 and an output Peg requested to the internal combustion engine 10 based on the accelerator pedal operating amount ACCP and the vehicle speed SPD. In particular, when a state of charge SOC of the battery 62 is greater than or equal to a predetermined value Sth, the output control process M30 selects an EV mode in which the output Pmg of the internal combustion engine 10 is set to zero. When the state of charge SOC is less than the predetermined value Sth, the output control process M30 selects an EHV mode in which the internal combustion engine 10 and the motor-generators 52 and 54 cooperate to ensure the requested output. The state of charge SOC is calculated by the CPU 72 based on the terminal voltage V or the charging-discharging current I. More specifically, for example, when the absolute value of the charging-discharging current I is negligibly small, the CPU 72 assumes the terminal voltage V to be the open end voltage, and calculates the state of charge SOC based on a relationship between the open end voltage and the state of charge SOC. When the absolute value of the charging-discharging current I is large, the state of charge SOC is updated by the charging-discharging current I.

An MG control process M32 outputs the operation signals MS8 and MS9 to the inverters 58 and 60 so that the sum of outputs of the motor-generators 52 and 54 becomes the output Pmg.

A throttle operation process M34 outputs the operation signal MS1 to the throttle valve 14 based on the output Peg so that the output of the internal combustion engine 10 becomes the output Peg.

In addition to the processes illustrated in FIG. 2, the control device 70 executes a process that calculates the deterioration level of the upstream catalyst 32. Hereinafter, the process will be described in detail with reference to FIG. 3 and other drawings.

Figure 3:
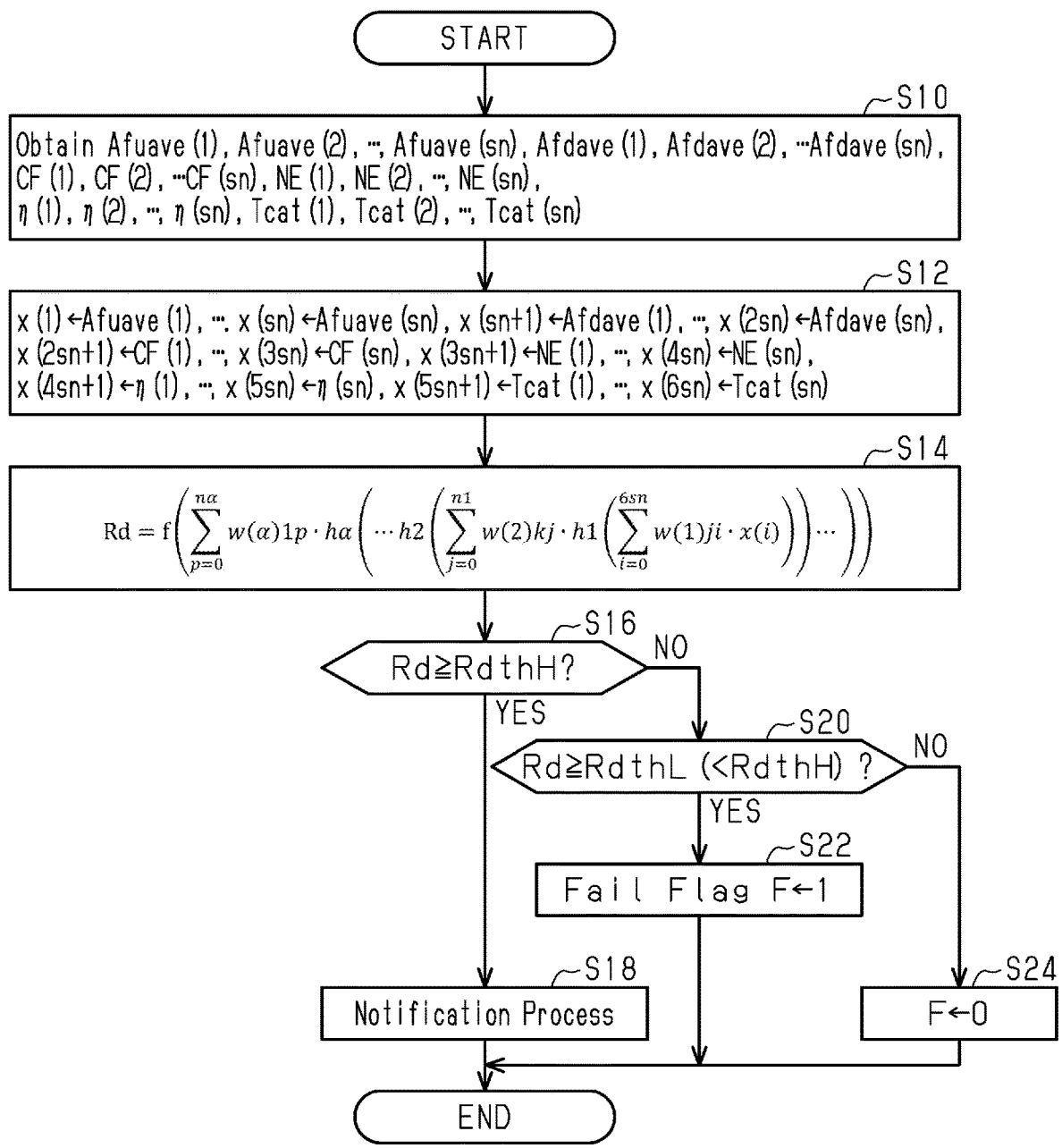
FIG. 3 is a flowchart illustrating the sequence of a process specified by a deterioration detection program according to the first embodiment.

The process illustrated in FIG. 3 is implemented, for example, by the CPU 72 repeatedly executing a deterioration detection program 74a stored in the ROM 74 illustrated in FIG. 1 at predetermined time intervals. In the following description, the number of each step is represented by the letter S followed by a numeral.

At the start of a series of steps illustrated in FIG. 3, the CPU 72 acquires time series data for each of the upstream average value Afuave, a downstream average value Afdave, the in-catalyst flow rate CF, the rotational speed NE, the charging efficiency η, and the catalyst temperature Tcat in a predetermined period (S10). Hereinafter, points in time of sampling are denoted by "1, 2, . . . , and sn" in order from the earliest one. For example, the time series data of the upstream average value Afuave are expressed as "Afuave (1) to Afuave (sn)". The term "sn" refers to the number of pieces of data included in the time series data of each variable. More specifically, the above-described predetermined period is set to a period in which "sn" pieces of data are sampled for each of the above-described variables. The above-described predetermined period is determined from a sampling time interval and the number of pieces of data "sn" and is not determined by a value such as the downstream detection value Afd.

The upstream average value Afuave is the average value of the upstream detection values Afu at an interval of the above-described time series data sampling. More specifically, the CPU 72 samples the upstream detection value Afu a number of times at an interval of the time series data sampling and calculates the average value of the upstream detection values Afu to set the average value to the upstream average value Afuave. In the same manner, the downstream average value Afdave is the average value of the downstream detection values Afd at an interval of the above-described time series data sampling.

Subsequently, the CPU 72 assigns the values that are acquired by step S10 to input variables x (1) to x (6sn) of a mapping that outputs a deterioration level variable Rd, which is a variable indicating the deterioration level of the upstream catalyst 32 (S12). More specifically, when m=1 to sn, the CPU 72 assigns an upstream average value Afuave (m) to an input variable x (m), assigns a downstream average value Afdave (m) to an input variable x (sn+m), assigns an in-catalyst flow rate CF (m) to an input variable x (2sn+m), and assigns a rotational speed NE (m) to an input variable x (3sn+m). In addition, the CPU 72 assigns a charging efficiency η (m) to an input variable x (4sn+m) and assigns a catalyst temperature Tcat (m) to an input variable x (5sn+m).

Subsequently, the CPU 72 calculates the deterioration level variable Rd, which is the output value of a mapping, by inputting the input variables x (1) to x (6sn) to a mapping that is specified by a map data 76a stored in the storage device 76 illustrated in FIG. 1 (S14). In the description, a calculation of the output value of a mapping refers to a calculation of a variable, i.e. a calculation of the value of the variable. In the present embodiment, the deterioration level variable Rd is quantified in the following manner.

$$Rd = 1 - RR$$

$RR$=(the maximum value of an actual oxygen storage amount of the upstream catalyst 32 at a predetermined temperature)/(the maximum value of the oxygen storage amount of a reference catalyst at the predetermined temperature)

Therefore, the larger the value of the deterioration level variable Rd is, the larger the deterioration level is. In particular, when the maximum value of the oxygen storage amount of the upstream catalyst 32 is equal to the maximum value of the oxygen storage amount of the reference catalyst, the deterioration level variable Rd is zero.

In the present embodiment, the mapping is configured by a neural network in which the number of intermediate layers is "α," activation functions h1 to hα of the intermediate layers are hyperbolic tangents, and activation function f of an output layer is a ReLU. Here, ReLU is a function that outputs the non-lesser one of an output and zero. For example, the node values of a first intermediate layer are generated by inputting the input variables x (1) to x (6sn) to a linear mapping specified by a factor w(1)ji (j=0 to n1 and i=0 to 6sn) to obtain outputs and inputting the outputs to the activation function h1. More specifically, when m=1, 2, . . . , and α, the node values of an m-th intermediate layer are generated by inputting the outputs of a linear mapping that is specified by a factor w(m) to an activation function hm. Here, n1, n2, . . . , and nα refers to the number of nodes in the first, a second, . . . , and an α-th intermediate layers. In addition, w(1)j0 is one of bias parameter, and an input variable x (0) is defined as one.

Subsequently, the CPU 72 determines whether or not the deterioration level variable Rd is greater than or equal to a specified value RdthH (S16). When it is determined that the deterioration level variable Rd is greater than or equal to the specified value RdthH (S16: YES), in order to prompt the user to perform repair, the CPU 72 executes a notification process that operates a warning lamp 99 illustrated in FIG. 1 to issue a notification (S18).

When it is determined that the deterioration level variable Rd is less than the specified value RdthH (S16: NO), the CPU 72 determines whether or not the deterioration level variable Rd is greater than or equal to a predetermined value RdthL (S20). The predetermined value RdthL is a value smaller than the specified value RdthH. When it is determined that the deterioration level variable Rd is greater than or equal to the predetermined value RdthL (S20: YES), the CPU 72 sets a fail flag F to one (S22). When step S18 is performed, it is assumed that the fail flag F is already set to one. When it is determined that the deterioration level variable Rd is less than the predetermined value RdthL (S20: NO), the CPU 72 assigns zero to the fail flag F (S24).

When steps S18, S22, and S24 are completed, the CPU 72 temporarily ends the series of steps illustrated in FIG. 3.

Figure 4:
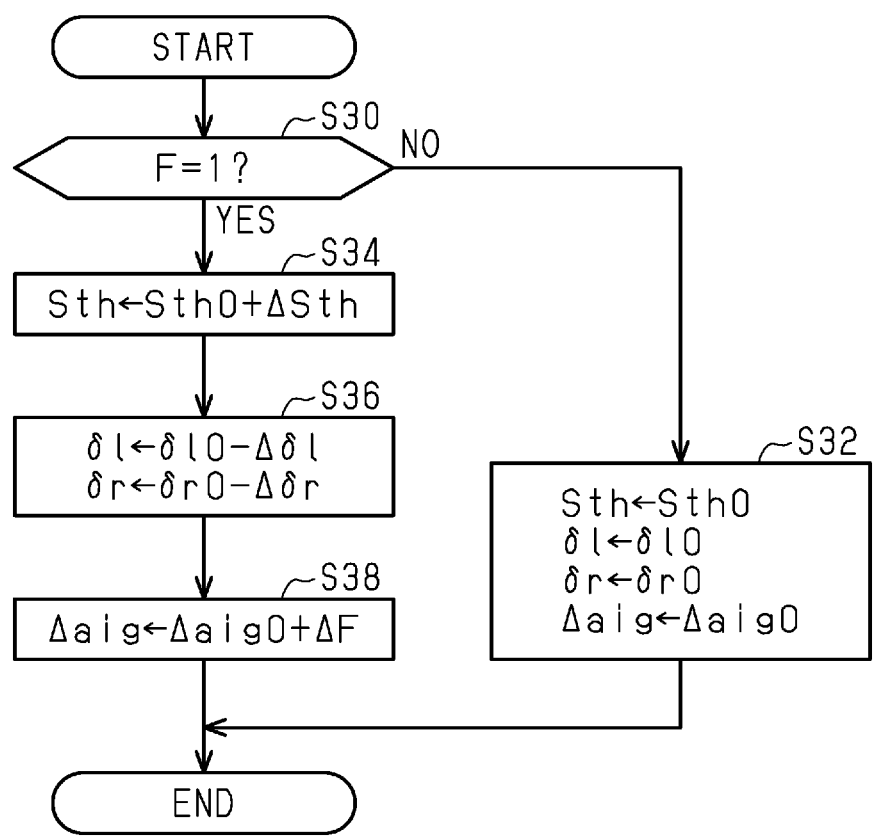
FIG. 4 is a flowchart illustrating the sequence of a fail-safe process according to the first embodiment.

FIG. 4 illustrates the sequence of steps other than step S18 in a process that deals with the deterioration of the upstream catalyst 32. The process illustrated in FIG. 4 is implemented, for example, by the CPU 72 repeatedly executing a fail-safe program 74b stored in the ROM 74 illustrated in FIG. 1 at predetermined time intervals.

At the start of a series of steps illustrated in FIG. 4, the CPU 72 determines whether or not the fail flag F is one (S30). When it is determined that the fail flag F is zero (S30: NO), the CPU 72 assigns a reference value Sth0 to the predetermined value Sth used in the output control process M30, assigns a reference amount δI0 to the specified amount δI and assigns a reference amount δr0 to the specified amount δr in the sub-feedback, and assigns a reference amount Δaig0 to the retard amount Δaig for a catalyst warm-up process (S32).

In contrast, when it is determined that the fail flag F is one (S30: YES), the CPU 72 obtains a value by performing an increase correction on the reference value Sth0 using a predetermined amount ΔSth and assigns the obtained value to the predetermined value Sth (S34). Taking into consideration that the capacity of the upstream catalyst 32 for oxidizing unburned fuel is lowered due to the deterioration, this process maximizes the stop state of the internal combustion engine 10 so that the amount of unburned fuel flowing into the upstream catalyst 32 is limited to a reduced amount.

The CPU 72 obtains a value by performing a decrease correction on the reference amount δI0 using a correction amount ΔδI and assigns the obtained value to the specified amount δI, and obtains a value by performing a decrease correction on the reference amount δr0 using a correction amount Δδr and assigns the obtained value to the specified amount δr (S36). Taking into consideration that the capacity of the upstream catalyst 32 for oxidizing unburned fuel is lowered due to the deterioration, this process limits the amount of unburned fuel flowing into the upstream catalyst 32 to a reduced amount. More specifically, in a case in which the fail flag F is one, the specified amount δr is set to be a smaller value than in a case in which the fail flag F is zero. This lowers the enrichment level when the target value Af* is set to be richer than the stoichiometric point Afs. For this reason, the amount of unburned fuel in the exhaust flowing into the upstream catalyst 32 per unit time is smaller than that in a case in which the fail flag F is zero. This limits the flow of unburned fuel toward a downstream side of the upstream catalyst 32.

In addition, the CPU 72 obtains a value by performing an increase correction on the reference amount Δaig0 using a correction amount ΔF and assigns the obtained value into the retard amount Δaig (S38). When the upstream catalyst 32 deteriorates, the exhaust purification performance of the upstream catalyst 32 is lower than when the upstream catalyst 32 does not deteriorate. Thus, the above-described process reduces the ratio of conversion of the combustion energy of the mixture into torque to increase the temperature of exhaust discharged to the exhaust passage 30 so that the upstream catalyst 32 is wormed up at an early time.

When steps S32 and S38 are completed, the CPU 72 temporarily ends the series of steps illustrated in FIG. 4.

The process of generating the map data 76a will now be described.

Figure 5:
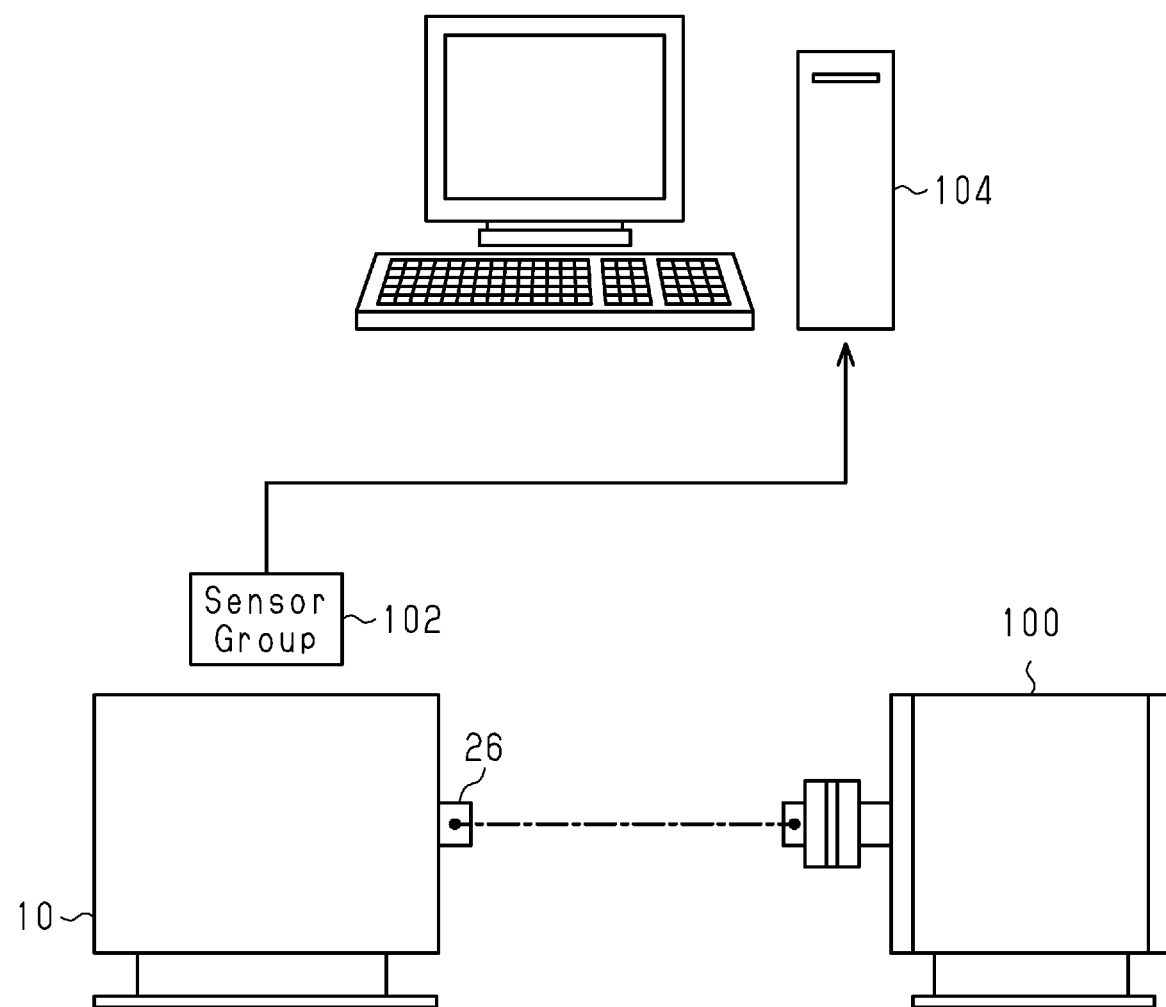
FIG. 5 is a diagram illustrating a system that generates map data according to the first embodiment.

FIG. 5 illustrates a system which generates the map data 76a.

As illustrated in FIG. 5, in the present embodiment, a dynamometer 100 is mechanically coupled to the crankshaft 26 of the internal combustion engine 10. When the internal combustion engine 10 runs, a sensor group 102 detects various state variables of the internal combustion engine 10. The detection results are input to an adaptation device 104, which is a computer that generates the map data 76a. The sensor group 102 includes sensors that detect values for generating inputs to a mapping such as the upstream air-fuel ratio sensor 82, the downstream air-fuel ratio sensor 84, and the crank angle sensor 86.

Figure 6:
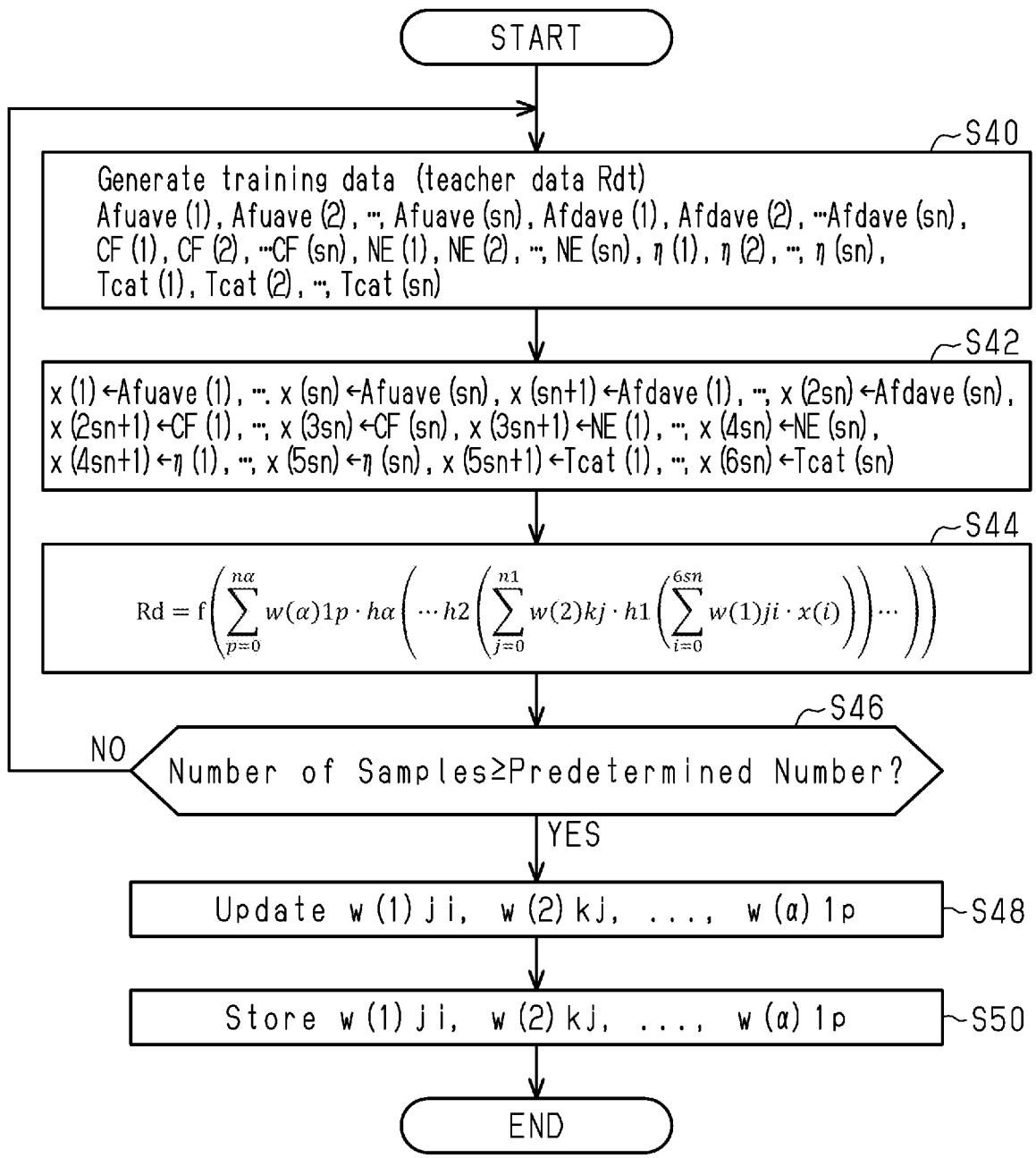
FIG. 6 is a flowchart illustrating the sequence of a map data learning process according to the first embodiment.

FIG. 6 illustrates the sequence of generating map data. The process illustrated in FIG. 6 is executed by the adaptation device 104. The process illustrated in FIG. 6 may be implemented, for example, by providing the adaptation device 104 with a CPU and a ROM and causing the CPU to execute programs stored in the ROM.

At the start of a series of steps illustrated in FIG. 6, based on the detection results of the sensor group 102, the adaptation device 104 acquires the same data as that acquired in step S10, as training data (S40). In a state in which two or more upstream catalysts 32 having deterioration level variables Rd that differ from each other, which are individually measured in advance, are prepared and one of the upstream catalysts 32 is selectively installed in the internal combustion engine 10, the process described above is executed so that the installed upstream catalyst 32 has a deterioration level variable Rdt that is used as teacher data.

In accordance with the procedure of step S12, the adaptation device 104 assigns the training data other than the teacher data to the input variables x (1) to x (6sn) (S42). Then, in accordance with the procedure of step S14, the adaptation device 104 calculates the deterioration level variable Rd by inputting the input variables x (1) to x (6sn) obtained by step S42 into a mapping (S44). Then, the CPU 72 determines whether or not the number of samples of the deterioration level variables Rd calculated by step S44 is greater than or equal to a predetermined number (S46). Here, in order to obtain the predetermined number of samples or greater, the deterioration level variable Rd needs to be calculated two times or more for each of the above-described upstream catalysts 32. Furthermore, the deterioration level variable Rd needs to be calculated at various operating points that are specified by the rotational speed NE and the charging efficiency η in accordance with changes in the operation mode of the internal combustion engine 10.

When it is determined that the number of samples is not greater than or equal to the predetermined number (S46: NO), the adaptation device 104 returns to step S40. When it is determined that the number of samples is greater than or equal to the predetermined number (S46: YES), the CPU 72 updates factors w(1)ji, w(2)kj, . . . , and w(α)1p to minimize the sum of the squares of the differences between the deterioration level variable Rdt as the teacher data and the deterioration level variable Rd calculated by step S44 (S48). Then, the adaptation device 104 stores the factors w(1)ji, w(2)kj, . . . , and w(α)1p as the map data 76a that is learned (S50).

The operation and advantages of the present embodiment will now be described.

The map data 76a is learned to specify a mapping that uses the time series data of each of the upstream average value Afuave, the downstream average value Afdave, the in-catalyst flow rate CF, the rotational speed NE, the charging efficiency η, and the catalyst temperature Tcat, as inputs to output the deterioration level variable Rd. The rotational speed NE and the charging efficiency η, which specify the operating points of the internal combustion engine 10, may be regarded as the flow rate variables indicating the flow rate of the fluid which flows into the upstream catalyst 32. The upstream average value Afuave is a variable indicating the ratio of the amount of actual fuel to the amount of fuel that reacts with oxygen contained in the fluid flowing into the upstream catalyst 32 without excess or deficiency. The amount of fuel that reacts with oxygen contained in the fluid flowing into the upstream catalyst 32 without excess or deficiency is referred to as the ideal fuel amount. Therefore, the upstream average value Afuave, the rotational speed NE, and the charging efficiency η collectively configure an excess amount variable, that is, a variable corresponding to an excess amount of the actual fuel in relation to the amount of fuel that reacts with oxygen contained in the fluid flowing into the upstream catalyst 32 without excess or deficiency. The excess amount may have a negative value. In other words, the excess amount may have a value obtained by multiplying "−1" by the deficient amount of the actual fuel in relation to the amount of fuel that reacts with oxygen contained in the fluid flowing into the upstream catalyst 32 without excess or deficiency.

The behavior of the downstream average value Afdave changes in accordance with the maximum value of the oxygen storage amount of the upstream catalyst 32 in addition to the above-described excess amount in the fluid flowing into the upstream catalyst 32. The maximum value of the oxygen storage amount changes in accordance with not only the deterioration level of the upstream catalyst 32 but also the temperature of the upstream catalyst 32. Therefore, it may be assumed that the deterioration level variable Rd of the upstream catalyst 32 is calculated by inputting time series data indicating the behavior of the downstream average value Afdave together with the time series data of the excess amount variable and the time series data of the catalyst temperature Tcat. As described above, the present embodiment does not use a mapping that is learned through machine learning by inputting a large number of various random variables of the internal combustion engine 10 to calculate the deterioration level variable Rd. Instead, in the present embodiment, the variables that are input to the mapping are carefully selected based on their relevance to the control of the internal combustion engine 10. For this reason, the number of the intermediate layers of the neural network and the number of data sn of the time series data are reduced as compared to a case in which the variables that are input to the mapping are not carefully selected based on their relevance to the control of the internal combustion engine 10. In this way, the structure of the mapping that calculates the deterioration level variable Rd may be simplified.

In particular, the behavior of the downstream average value Afdave for the excess amount variable and the catalyst temperature Tcat is recognized from the time series data of these variables. Thus, the deterioration level variable Rd is calculated without directly detecting that the oxygen storage amount of the upstream catalyst 32 has reached zero or the maximum value. Since the deterioration level variable Rd is calculated without changing the target value Af* for the detection of the deterioration level, the accumulated amount of deviation of the composition of the fluid flowing into the upstream catalyst 32 from the composition that is appropriate for the purification performance of the upstream catalyst 32 is reduced.

The present embodiment described above further obtains the following advantages.

(1) The input to the mapping includes the upstream average value Afuave. As compared to a case in which the upstream detection value Afu for each time interval of the time series data is used, further accurate information regarding oxygen and unburned fuel flowing into the upstream catalyst 32 is obtained without increasing the number of data pieces of the time series data. Ultimately, the deterioration level variable Rd is calculated with higher accuracy.

(2) The input to the mapping includes the downstream average value Afdave. As compared to a case in which the downstream detection value Afd for each time interval of the time series data is used, further accurate information regarding oxygen and unburned fuel flowing out from the upstream catalyst 32 is obtained without increasing the number of data pieces of the time series data. Ultimately, the deterioration level variable Rd is calculated with higher accuracy.

(3) The input to the mapping includes the rotational speed NE and the charging efficiency η, which are used as operating point variables specifying the operating points of the internal combustion engine 10. The operating amounts of the operation units such as the ignition device 24, the EGR valve 38, and the intake variable valve timing device 40 of the internal combustion engine 10 tend to be determined based on the operating point of the internal combustion engine 10. For this reason, the operating point variable is a variable that not only configures the flow rate variable, together with the upstream average value Afuave, but also includes information related to the operating amount of each operation unit. Therefore, the deterioration level variable Rd is calculated based on the information related to the operating amount of each operation unit by inputting the operating point variable to the mapping. Ultimately, the deterioration level variable Rd is calculated with higher accuracy.

(4) The input to the mapping includes the in-catalyst flow rate CF. The in-catalyst flow rate CF is a variable that affects the rate of reaction between unburned fuel and oxygen in the upstream catalyst 32. For this reason, when the in-catalyst flow rate CF is input to the mapping, the deterioration level variable Rd is calculated with higher accuracy. In the present embodiment, the in-catalyst flow rate CF is calculated from the operating point variables of the internal combustion engine 10. In principle, when the input to the mapping includes the operating point variables, the effect of the in-catalyst flow rate CF on the rate of reaction between unburned fuel and oxygen in the upstream catalyst 32 is reflected during calculation of the deterioration level variable Rd without using the in-catalyst flow rate CF. However, to accomplish such calculation, the number of intermediate layers in the neural network and the number sn of pieces of data in the time series data tend to increase. In this regard, in the present embodiment, since the input to the mapping includes the in-catalyst flow rate CF, the structure of the mapping may be simplified.

Second Embodiment

Hereinafter, a second embodiment will be described with reference to the drawings focusing on the differences from the first embodiment.

In the present embodiment, the output of the neural network is a maximum value Cmax of the current oxygen storage amount of the upstream catalyst 32.

Figure 7:
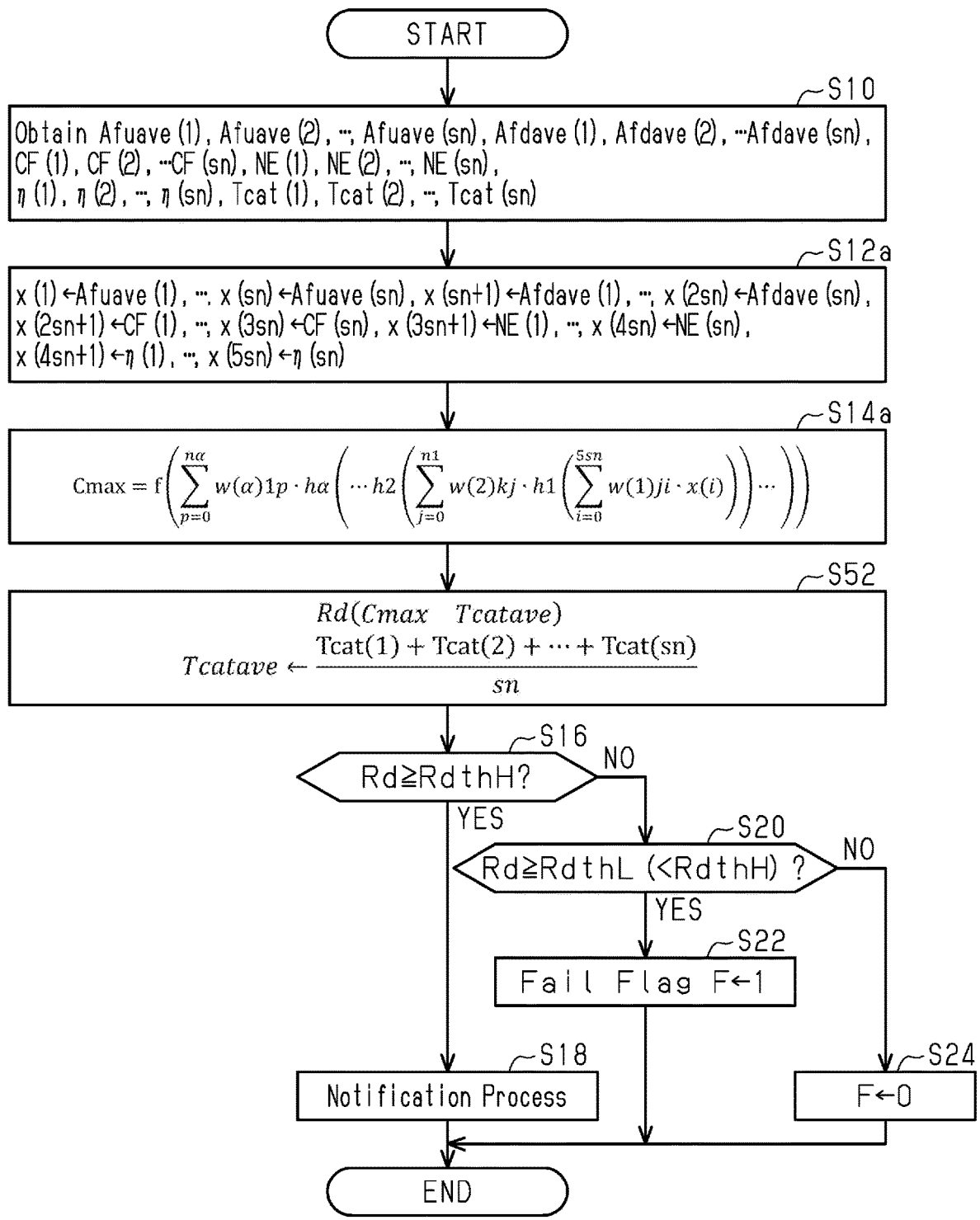
FIG. 7 is a flowchart illustrating the sequence of a process specified by a deterioration detection program according to a second embodiment.

FIG. 7 illustrates the sequence of a process executed by the control device 70 in the present embodiment. The process illustrated in FIG. 7 is implemented, for example, by the CPU 72 repeatedly executing the deterioration detection program 74a stored in the ROM 74 illustrated in FIG. 1 at predetermined time intervals. For the sake of convenience, in the process illustrated in FIG. 7, the same step numbers are given to the steps corresponding to the steps illustrated in FIG. 3.

At the start of a series of steps illustrated in FIG. 7, when step S10 is completed, the CPU 72 inputs the time series data other than the catalyst temperature Tcat to the input variables x (1) to x (5sn) of the mapping (S12a), instead of executing step S12. The same variables as used in step S12 are assigned to the input variables x (1) to x (5sn).

The CPU 72 calculates the maximum value Cmax through a neural network that uses the input variables x (1) to x (5sn) as inputs and uses the maximum value Cmax as an output (S14a). The CPU 72 uses map data that uses a catalyst temperature average value Tcatave, which is the average value of the catalyst temperatures Tcat acquired in S10, and the maximum value Cmax as input variables and uses the deterioration level variable Rd as an output variable to obtain the deterioration level variable Rd through map calculation (S52).

The CPU 72 proceeds to step S16.

In the present embodiment, the factors w(1)ji, w(2)kj, . . . , and w(α)1p of the neural network may be learned using the following teacher data. More specifically, the relationship between the temperature and the maximum value Cmax of each of the above-described upstream catalysts 32 may be measured in advance. In a step corresponding to the step illustrated in FIG. 6, the current maximum value Cmax of the corresponding one of the target upstream catalysts 32 may be obtained and used as teacher data.

Third Embodiment

Hereinafter, a third embodiment will be described with reference to the drawings focusing on the differences from the first embodiment.

In the present embodiment, average values of the time series data of each of the in-catalyst flow rate CF, the rotational speed NE, the charging efficiency η, and the catalyst temperature Tcat are calculated and used as inputs to the mapping. Hereinafter, in FIG. 8, it is assumed in the present embodiment that the number sn of pieces of data in the time series data of each variable acquired by step S10 is a multiple of five.

Figure 8:
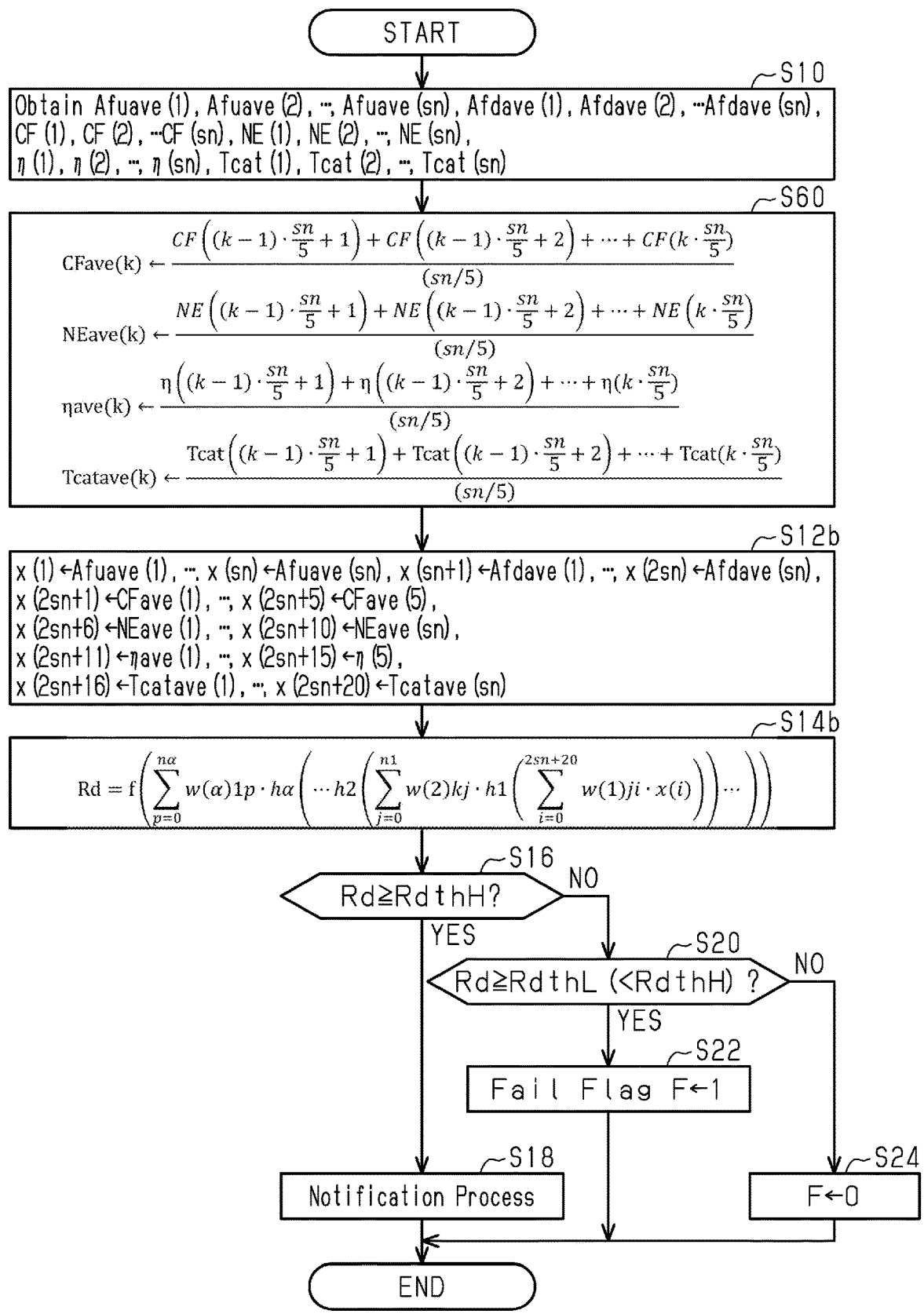
FIG. 8 is a flowchart illustrating the sequence of a process specified by a deterioration detection program according to a third embodiment.

FIG. 8 illustrates the sequence of a process executed by the control device 70 in the present embodiment. The process illustrated in FIG. 8 is implemented, for example, by the CPU 72 repeatedly executing the deterioration detection program 74a stored in the ROM 74 illustrated in FIG. 1 at predetermined time intervals. For the sake of convenience, in the process illustrated in FIG. 8, the same step numbers are given to the steps corresponding to the steps illustrated in FIG. 3.

In a series of the steps illustrated in FIG. 8, when step S10 is completed, the CPU 72 calculates an average value of each set of "sn/5" elements in order from the earliest element in each of the in-catalyst flow rates CF, the rotational speeds NE, the charging efficiencys η, and the catalyst temperatures Tcat (S60). More specifically, for example, an in-catalyst flow rate average value CFave (1) is calculated as the average value of in-catalyst flow rates CF (1), CF (2), . . . , and CF (sn/5). An in-catalyst flow rate average value CFave (2) is calculated as the average value of in-catalyst flow rates CF ((sn/5)+1), CF ((sn/5)+2), . . . , and CF (2n/5). In this manner, time series data including five sets of in-catalyst flow rate average values CFave, time series data including five sets of rotational speed average values NEave, time series data including five sets of charging efficiency average values ηave, and time series data including five sets of catalyst temperature average values Tcatave are produced.

Subsequently, the CPU 72 assigns the time series data generated by step S60 and the time series data of each of the upstream average value Afuave and the downstream average value Afdave acquired in step S10 to the input variable x of the mapping (S12b). More specifically, when m=1 to sn, the CPU 72 assigns the upstream average value Afuave (m) to the input variable x (m), and assigns the downstream average value Afdave (m) to the input variable x (sn+m). In addition, when m=1 to 5, the CPU 72 assigns an in-catalyst flow rate average value CFave (m) to the input variable x (2sn+m), and assigns a rotational speed average value NEave (m) to an input variable x (2sn+5+m). In addition, the CPU 72 assigns a charging efficiency average value ηave (m) to an input variable x (2sn+10+m), and assigns a catalyst temperature average value Tcatave (m) to an input variable x (2sn+15+m).

Then, the CPU 72 calculates the deterioration level variable Rd through a neural network that uses the input variables x (1) to x (2sn+20) generated in S12b as inputs and uses the deterioration level variable Rd as an output (S14b). The factor w(1)ji is where "i=0 to 2sn+20".

When step S14b is completed, the CPU 72 proceeds to step S16.

As described above, according to the present embodiment, the in-catalyst flow rate average value CFave, the rotational speed average value NEave, the charging efficiency average value ηave, and the catalyst temperature average value Tcatave are used as the inputs to the mapping. This reduces the dimensions of the input to the mapping. In the present embodiment, the excess amount variable is collectively configured by the time series data of the upstream average value Afuave, the time series data of the rotational speed average value NEave, and the time series data of the charging efficiency average value ηave. The rotational speed average value NEave and the charging efficiency average value ηave represent the operating points of the internal combustion engine 10 in a period in which "sn/5" sets of the upstream average values Afuave are sampled.

Fourth Embodiment

Hereinafter, a fourth embodiment will be described with reference to the drawings focusing on the differences from the first embodiment.

In the present embodiment, as the map data 76a, the storage device 76 stores different map data for each of the operating point of the internal combustion engine 10 and the catalyst temperature Tcat.

Figure 9:
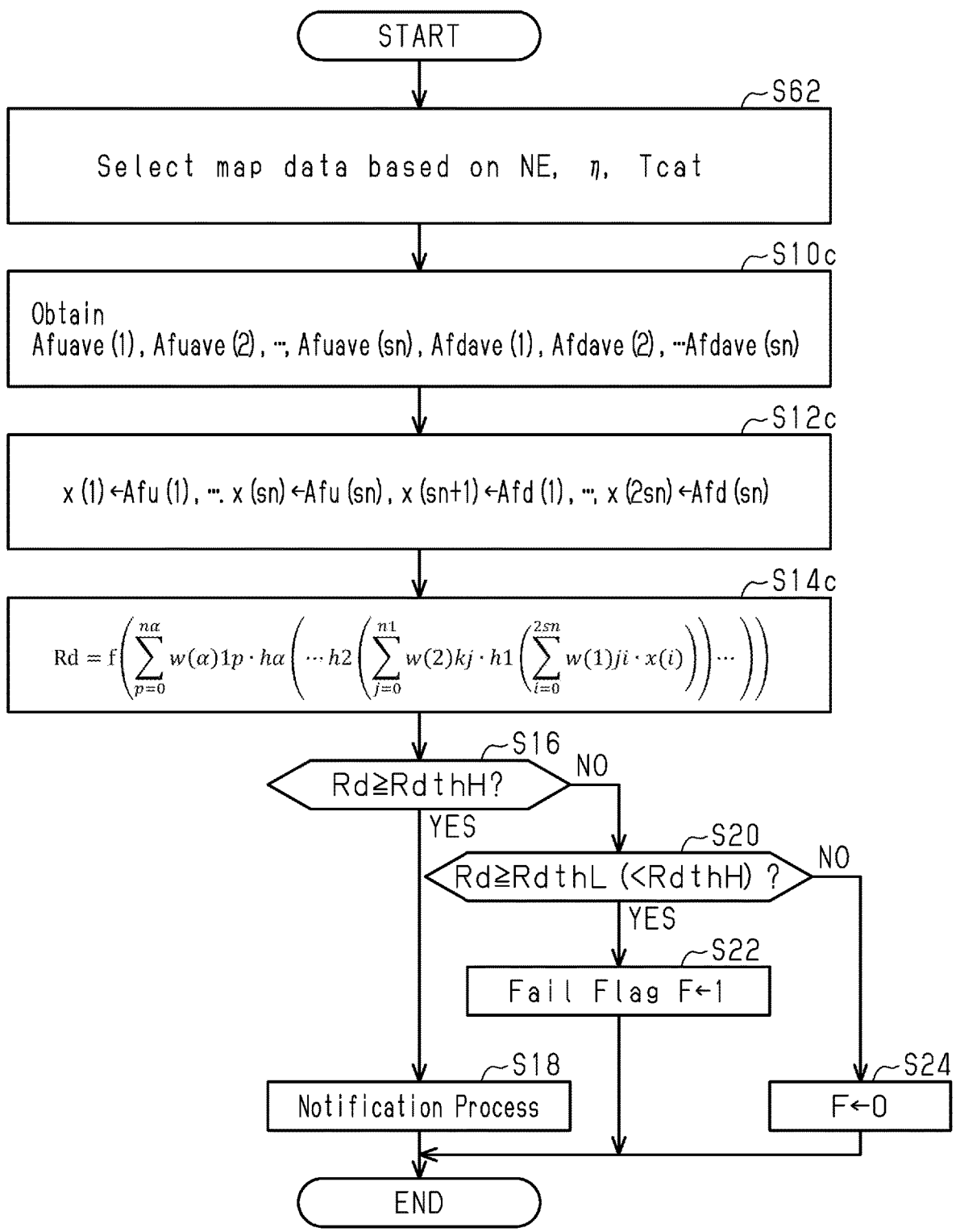
FIG. 9 is a flowchart illustrating the sequence of a process specified by a deterioration detection program according to a fourth embodiment.

FIG. 9 illustrates the sequence of a process executed by the control device 70 in the present embodiment. The process illustrated in FIG. 9 is implemented, for example, by the CPU 72 repeatedly executing the deterioration detection program 74a stored in the ROM 74 illustrated in FIG. 1 at predetermined time intervals. For the sake of convenience, in the process illustrated in FIG. 9, the same step numbers are given to the steps corresponding to the steps illustrated in FIG. 3.

In a series of the steps illustrated in FIG. 9, first, the CPU 72 selects map data for calculating the deterioration level variable Rd in accordance with the rotational speed NE and the charging efficiency η, which specify the operating point of the internal combustion engine 10, and the catalyst temperature Tcat (S62). This process can be implemented, for example, when the ROM 74 stores in advance map data that uses the rotational speed NE, the charging efficiency η, and the catalyst temperature Tcat as input variables and uses the variable specifying the map data as an output variable, by the CPU 72 obtaining a variable that specifies the map data through map calculation. The CPU 72 acquires time series data of each of the upstream average value Afuave and the downstream average value Afdave (S10c).

Subsequently, the CPU 72 assigns the time series data acquired in step S10c to the input variable x of the mapping that is specified by the map data selected by step S62 (S12c). More specifically, when m=1 to sn, the CPU 72 assigns the upstream average value Afuave (m) to the input variable x (m), and assigns the downstream average value Afdave (m) to the input variable x (sn+m). The CPU 72 calculates the deterioration level variable Rd through a neural network that uses the input variables x (1) to x (2sn) generated in step S12c as inputs and uses the deterioration level variable Rd as an output (S14c). The factor w(1)ji is where "i=0 to 2sn".

When step S14c is completed, the CPU 72 proceeds to step S16.

In the learning of map data that is used when the operating point is within a predetermined range and the catalyst temperature Tcat is within a predetermined range, only training data in which the operating point is within the predetermined range and the catalyst temperature Tcat is within the predetermined range is used.

As described above, in the present embodiment, the deterioration level variable Rd is calculated using different map data in accordance with the operating point of the internal combustion engine 10 and the catalyst temperature Tcat. Thus, when the operating point of the internal combustion engine 10 varies widely, the CPU 72 calculates the deterioration level variable Rd using different map data. Therefore, when a mapping specified by a single piece of map data is used, the flow rate of the fluid flowing into the upstream catalyst 32 does not widely change. In this case, the excess amount of an actual fuel in relation to the amount of fuel that reacts with oxygen contained in the fluid flowing into the upstream catalyst 32 without excess or deficiency may be recognized simply from the upstream average value Afuave. More specifically, the above-described excess amount variable may be configured by only the upstream average value Afuave. In addition, when the mapping specified by a single piece of map data is used, the catalyst temperature Tcat does not greatly change. In this case, in a situation in which the mapping specified by a single piece of map data is used, when the maximum value Cmax of the oxygen storage amount is small, the deterioration level of the upstream catalyst 32 is larger than when the maximum value Cmax is large. More specifically, the deterioration level is quantified in accordance with the maximum value Cmax at the current temperature.

For this reason, in the present embodiment, the dimensions of the variables that are input to the mapping are reduced. As a result, the number nα of the intermediate layers is reduced. Therefore, in the present embodiment, the structure of the mapping is simplified.

Fifth Embodiment

Hereinafter, a fifth embodiment will be described with reference to the drawings focusing on the differences from the first embodiment.

In the present embodiment, the storage device 76 stores three types of map data as the map data 76a.

Figure 10:
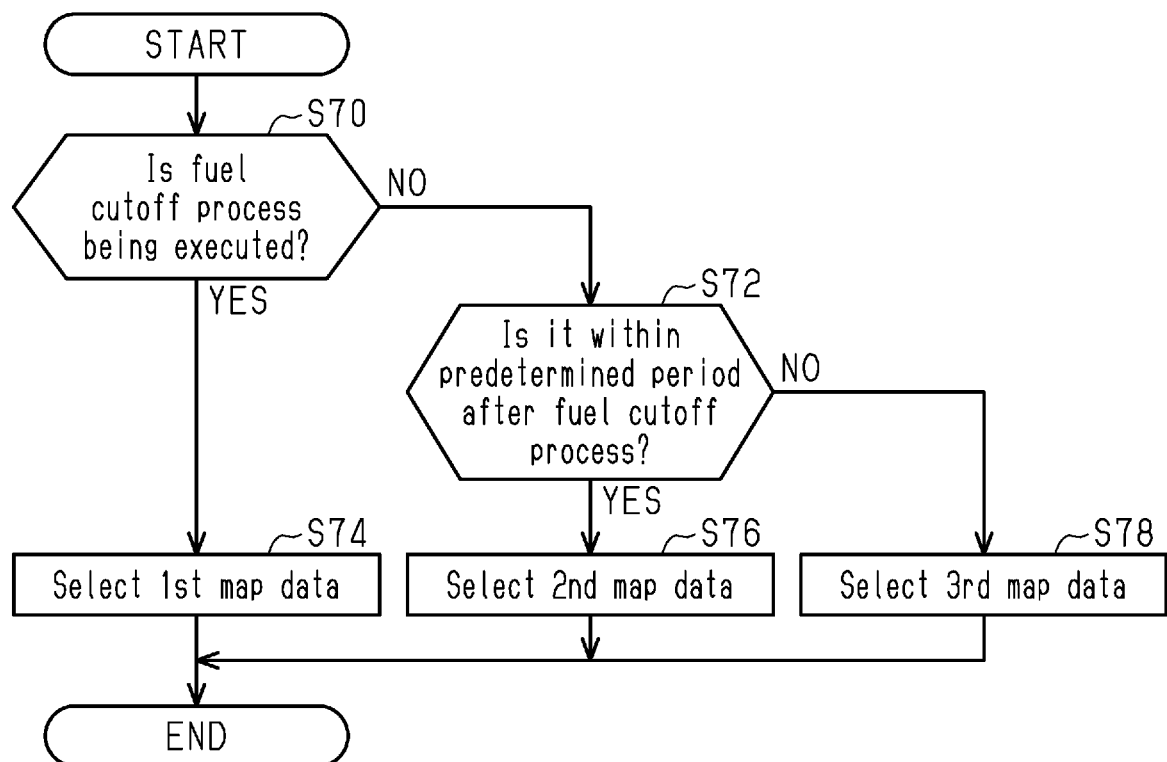
FIG. 10 is a flowchart illustrating the sequence of a process that selects map data according to a fifth embodiment.

FIG. 10 illustrates the sequence of a process that selects any one of the three types of map data to calculate the deterioration level variable Rd. The process illustrated in FIG. 10 is implemented, for example, by the CPU 72 repeatedly executing the deterioration detection program 74a stored in the ROM 74 illustrated in FIG. 1 at predetermined time intervals.

In a series of steps illustrated in FIG. 10, first, the CPU 72 determines whether or not the fuel cutoff process is being executed (S70). Then, when it is determined that the fuel cutoff process is being executed (S70: YES), the CPU 72 selects first map data (S74). The first map data is map data that is dedicated to when the fuel cutoff process is executed, and is learned by using data in the fuel cutoff process as training data.

When it is determined that the fuel cutoff process is not being executed (S70: NO), the CPU 72 determines whether or not it is within the above-described predetermined period after the fuel cutoff process (S72). Then, when it is determined that it is within the predetermined period (S72: YES), the CPU 72 selects a second map data (S76). The second map data is learned by using time series data that is sampled in the predetermined period after the fuel cutoff process as training data. More specifically, the second map data is learned by using time series data that is sampled during a period in which an increase correction is performed on the request injection amount Qd as training data.

When it is determined that it is not within the predetermined period (S72: NO), the CPU 72 selects a third map data (S78). The third map data is learned by using time series data that is sampled in a period that excludes the fuel cutoff process and the predetermined period after the fuel cutoff process as training data.

When steps S74, S76, and S78 are completed, the CPU 72 temporarily ends the series of steps illustrated in FIG. 10.

As described above, in the present embodiment, the deterioration level variable Rd is calculated by using different map data for when the fuel cutoff process is being executed, the predetermined period after the fuel cutoff process, and the period outside of these specifically described periods. During the fuel cutoff process, a large amount of oxygen flows into the upstream catalyst 32, and the air-fuel ratio of the mixture, which is subject to combustion, tends to be disturbed in the predetermined period after the fuel cutoff process. For this reason, as compared to a case in which single map data is used for these different situations, the structure of the mapping may be simplified.

Sixth Embodiment

Hereinafter, a sixth embodiment will be described with reference to the drawings focusing on the differences from the fourth embodiment.

The present embodiment aims to simplify the structure of the mapping by limiting conditions that allow the sampling of variables that are used to calculate the deterioration level variable Rd.

Figure 11:
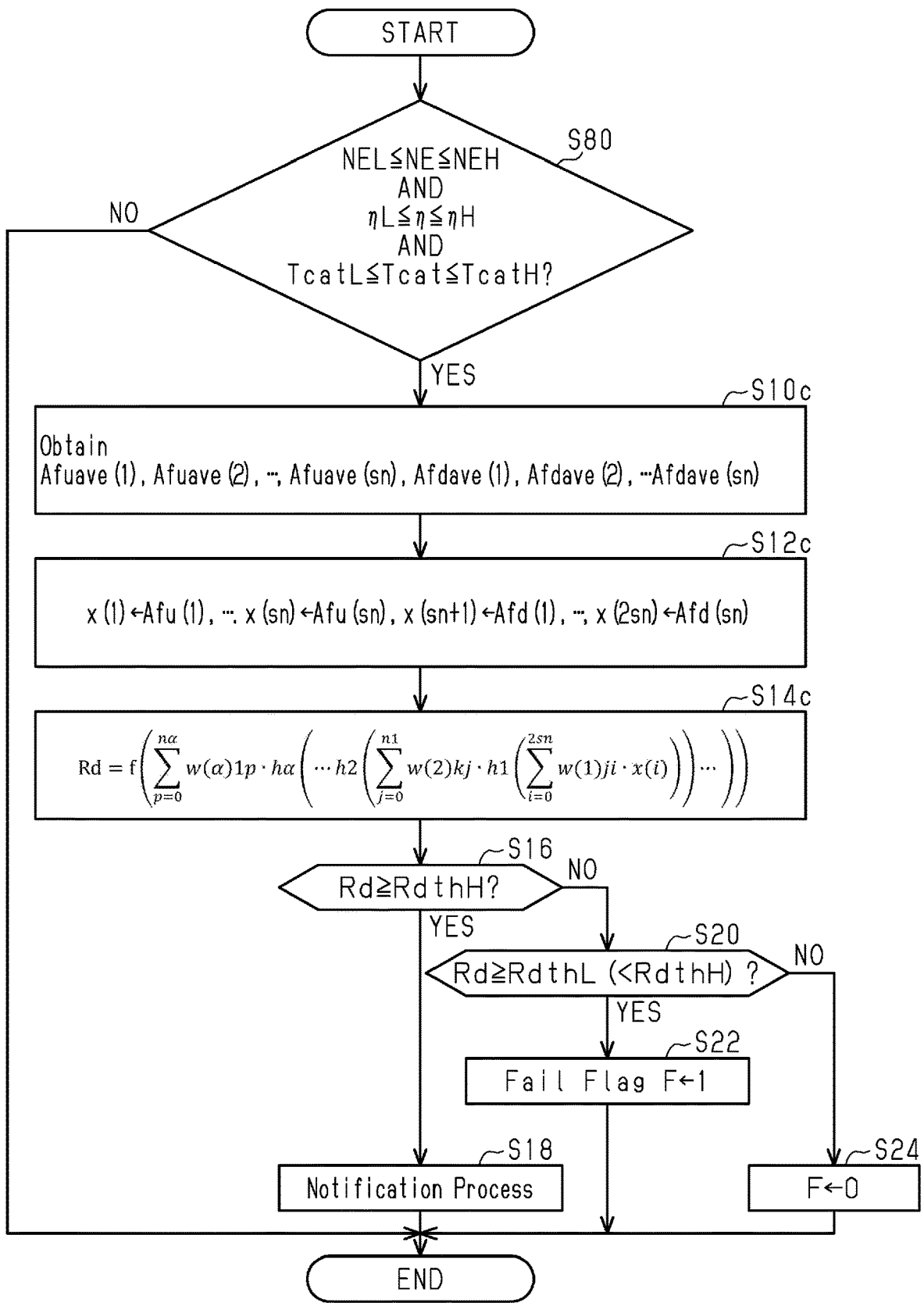
FIG. 11 is a flowchart illustrating the sequence of a process specified by a deterioration detection program according to a sixth embodiment.

FIG. 11 illustrates the sequence of a process executed by the control device 70 in the present embodiment. The process illustrated in FIG. 11 is implemented, for example, by the CPU 72 repeatedly executing the deterioration detection program 74a stored in the ROM 74 illustrated in FIG. 1 at predetermined time intervals. For the sake of convenience, in the process illustrated in FIG. 11, the same step numbers are given to the steps corresponding to the steps illustrated in FIG. 3.

In a series of the steps illustrated in FIG. 11, the CPU 72 determines whether or not the logical product of the following conditions (A) to (C) is true (S80).

Condition (A) is a condition indicating that the rotational speed NE is greater than or equal to a first speed NEL and less than or equal to a second speed NEH.

Condition (B) is a condition indicating that the charging efficiency η is greater than or equal to a first charging efficiency ηL and less than or equal to a second charging efficiency ηH.

Condition (C) is a condition indicating that the catalyst temperature Tcat is greater than or equal to a first temperature TcatL and less than or equal to a second temperature TcatH.

When it is determined that the above-described logical product is true (S80: YES), the CPU 72 determines that the sampling of inputs to the mapping is allowed and executes the steps following S10c illustrated in FIG. 9.

As described above, in the present embodiment, the deterioration level variable Rd is calculated only in a case in which the operating point of the internal combustion engine 10 is within in the predetermined range and the catalyst temperature Tcat is within the predetermined range. The limitation imposed on the range of the operating point allows calculation of the deterioration level variable Rd only in a case in which the flow rate of the fluid flowing into the upstream catalyst 32 does not widely differ from a reference value. In this case, an excess amount of an actual fuel in relation to the amount of fuel that reacts with oxygen contained in the fluid flowing into the upstream catalyst 32 without excess or deficiency may be recognized simply from the upstream average value Afuave. More specifically, the above-described excess amount variable may be configured only by the upstream average value Afuave. In addition, the limitation imposed on the range of the catalyst temperature Tcat allows calculation of the deterioration level variable Rd only in a case in which the catalyst temperature Tcat does not widely differ from a reference temperature. In this case, when the maximum value Cmax of the oxygen storage amount is small, the deterioration level of the upstream catalyst 32 is larger than when the maximum value Cmax is large. More specifically, the deterioration level is quantified in accordance with the maximum value Cmax at the current temperature.

For this reason, in the present embodiment, the dimensions of the variables that are input to the mapping are reduced. As a result, the number nα of the intermediate layers is reduced. Therefore, in the present embodiment, the structure of the mapping may be simplified.

Seventh Embodiment

Hereinafter, a seventh embodiment will be described with reference to the drawings focusing on the differences from the first embodiment.

The present embodiment aims to simplify the structure of the mapping by limiting conditions that allow the sampling of variables that are used to calculate the deterioration level variable Rd.

Figure 12:
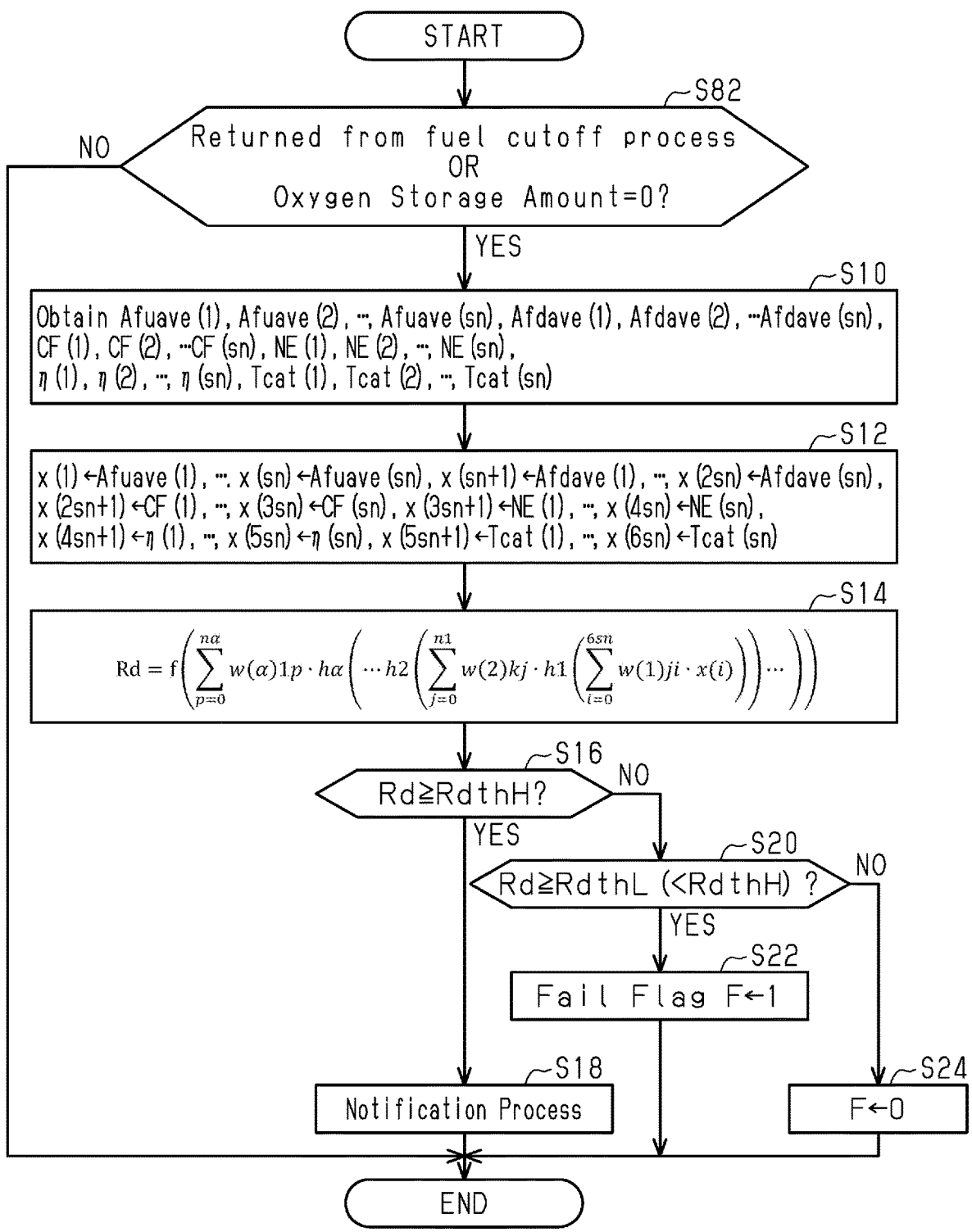
FIG. 12 is a flowchart illustrating the sequence of a process specified by a deterioration detection program according to a seventh embodiment.

FIG. 12 illustrates the sequence of a process executed by the control device 70 in the present embodiment. The process illustrated in FIG. 12 is implemented, for example, by the CPU 72 repeatedly executing the deterioration detection program 74a stored in the ROM 74 illustrated in FIG. 1 at predetermined time intervals. For the sake of convenience, in the process illustrated in FIG. 12, the same step numbers are assigned to the steps corresponding to the steps illustrated in FIG. 3.

In a series of the steps illustrated in FIG. 12, first, the CPU 72 determines whether or not the logical sum of a condition (D) that indicates a return from the fuel cutoff process and a condition (E) indicating that the oxygen storage amount is zero is true (S82). In this step, it is determined whether or not the oxygen storage amount of the upstream catalyst 32 is zero or the maximum value Cmax. Whether the oxygen storage amount is zero may be detected, for example, when the feedback control of the air-fuel ratio is greatly deviated and the downstream detection value Afd is set to be rich shortly after the upstream detection value Afu is set to be rich.

When it is determined that the logical sum is true (S82: YES), the CPU 72 executes steps S10 to S24. When the step S14 is executed once, the CPU 72 does not calculate the deterioration level variable Rd until it is determined again in step S82 that the logical sum is true.

As described above, according to the present embodiment, the initial value of the time series data that is input to the mapping can be fixed when the oxygen storage amount of the upstream catalyst 32 corresponds to the maximum value Cmax or zero. For this reason, the mapping that outputs the deterioration level variable Rd may be a mapping that uses time series data corresponding to when the oxygen storage amount of the upstream catalyst 32 corresponds to the maximum value Cmax or zero as an input and outputs the deterioration level variable Rd. The structure of the mapping may be simplified as compared to a mapping that outputs the deterioration level variable Rd in any situation.

Eighth Embodiment

Hereinafter, an eighth embodiment will be described with reference to the drawings focusing on the differences from the first embodiment.

In the present embodiment, the process that calculates the deterioration level variable Rd is performed outside the vehicle.

Figure 13:
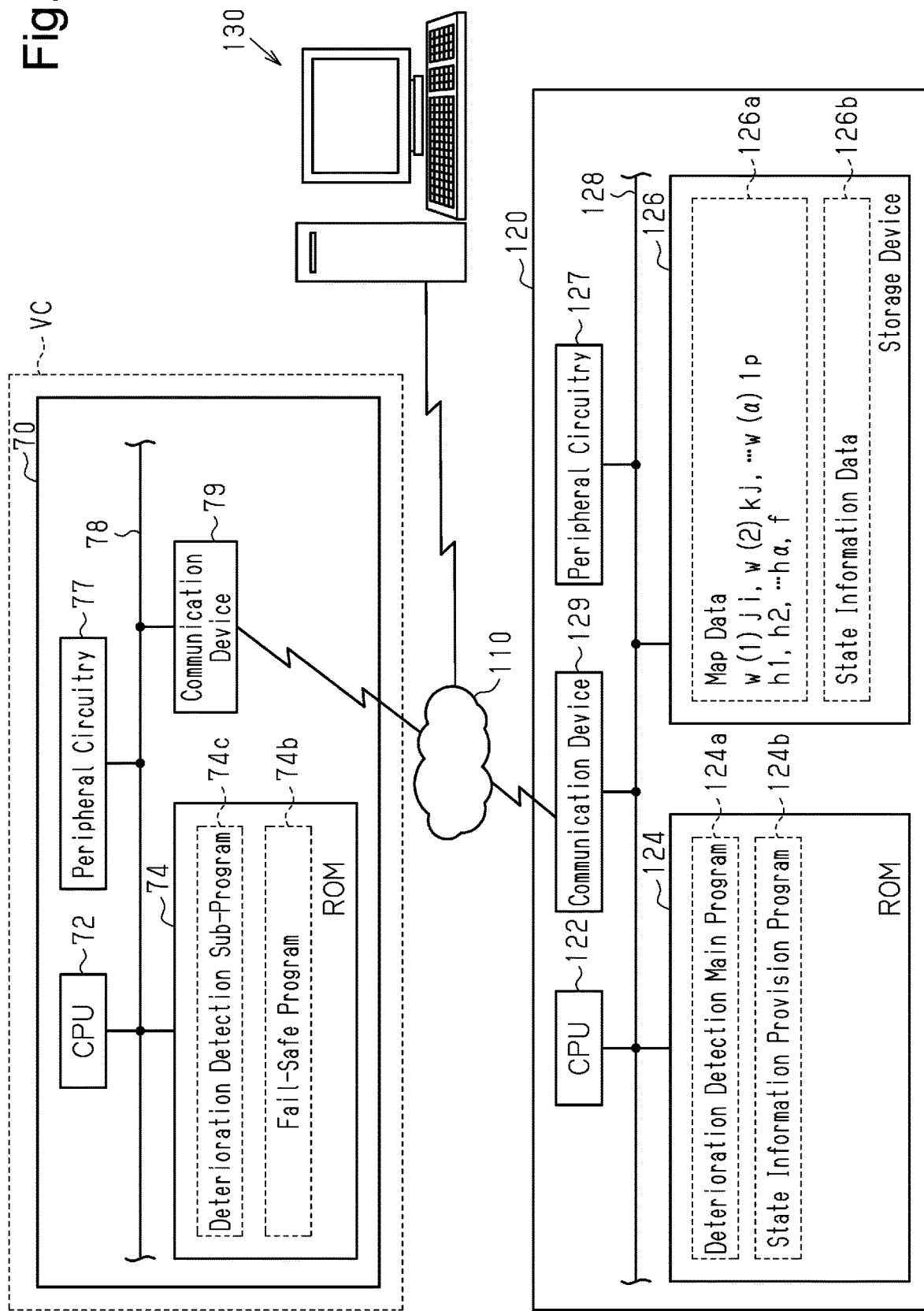
FIG. 13 is a block diagram illustrating the configuration of a catalyst deterioration detection system and a dealer terminal according to an eighth embodiment.

FIG. 13 illustrates a catalyst deterioration detection system according to the present embodiment. For the sake of convenience, in FIG. 13, the same reference characters are given to the members corresponding to the members illustrated in FIG. 1.

The control device 70 installed in the vehicle VC illustrated in FIG. 13 includes a communication device 79. The communication device 79 is a device for communicating with a center 120 via a network 110 outside the vehicle VC.

The center 120 analyzes data received from a plurality of vehicles VC. The center 120 includes a CPU 122, a ROM 124, a storage device 126, peripheral circuitry 127, and a communication device 129, and these devices are configured to communicate with each other through a local network 128. The ROM 124 stores a deterioration detection main program 124a. The storage device 126 stores a map data 126a.

The center 120 is configured to communicate with a terminal 130 of a used vehicle dealer through the network 110.

Figure 14:
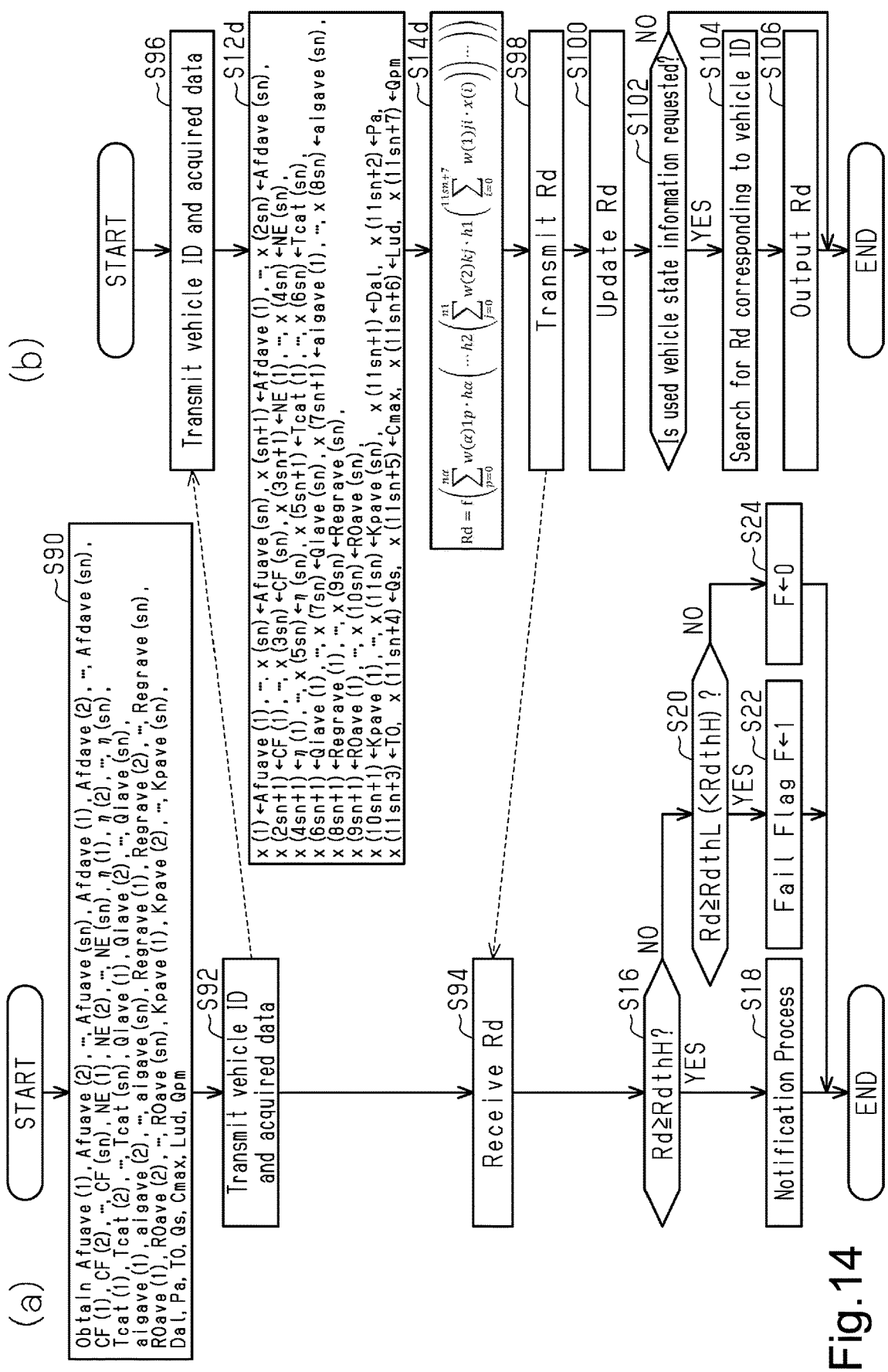
FIG. 14 is a flowchart illustrating the sequence of a process executed by the catalyst deterioration detection system according to the eighth embodiment.

FIG. 14 shows the sequence of a process executed by the system illustrated in FIG. 13. The process illustrated in (a) in FIG. 14 is implemented by the CPU 72 executing a deterioration detection sub-program 74c stored in the ROM 74 illustrated in FIG. 13. The process illustrated in (b) in FIG. 14 is implemented by the CPU 122 executing the deterioration detection main program 124a and a state information provision program 124b that are stored in the ROM 124. For the sake of convenience, in FIG. 14, the same step numbers are given to the steps corresponding to the steps illustrated in FIG. 2. Hereinafter, the processes illustrated in FIG. 14 will be described along the time series of a deterioration detection process.

As illustrated in (a) in FIG. 14, the CPU 72 installed in the vehicle VC acquires variables as the input to the mapping in addition to the time series data acquired in step S10 (S90). More specifically, the CPU 72 acquires time series data of an increase amount average value Qiave, which is the average value of increase amounts Qi of the request injection amount Qd from the base injection amount Qb. The increase amount Qi may have a negative value. The increase amount Qi indicates an excess or deficiency amount of the actual fuel in relation to the amount of fuel that sets the air-fuel ratio of the mixture to the stoichiometric air-fuel ratio. The increase amount Qi configures the excess amount variable.

The CPU 72 acquires the following variables as variables that are related to the operating amounts of the operation units of the internal combustion engine 10. The variables change the combustion of the mixture in the combustion chamber 20 to change the compositions of the fluid flowing into the upstream catalyst 32. More specifically, the CPU 72 acquires time series data of an ignition timing average value aigave, which is an average value of the ignition timings aig that are set by the ignition device 24. In addition, the CPU 72 acquires time series data of an EGR rate average value Regrave, which is an average value of EGR rates Regr, that is, the ratio of the flow rate of the fluid to the sum of the flow rate of air taken into the intake passage 12 and the flow rate of the same fluid flowing from the EGR passage 36 into the intake passage 12. In addition, the CPU 72 acquires time series data of an overlap average value ROave, which is an average value of overlaps RO, that is, a period in which the valve opening period of the intake valve 18 overlaps the valve opening period of the exhaust valve 28. The CPU 72 acquires time series data of an injection division ratio average value Kpave, which is an average value of the injection division ratios Kp.

In addition, the CPU 72 acquires an alcohol concentration Dal in the fuel. This variable is acquired taking into consideration that the stoichiometric air-fuel ratio of the fuel changes in accordance with alcohol concentration. The alcohol concentration Dal may be estimated from, for example, the correction ratio δ of the feedback process M12 described above. The CPU 72 acquires the atmospheric pressure Pa and the ambient temperature TO as variables that are related to the environments and change the combustion of the mixture in the combustion chamber 20 to change the compositions of the fluid flowing into the upstream catalyst 32.

The CPU 72 acquires a sulfur deposition amount Qs of the upstream catalyst 32, which is one of the state variables of the upstream catalyst 32 that is related to changing over time. This variable is acquired taking into consideration that the purification capacity of the upstream catalyst 32 changes in accordance with the sulfur deposition amount Qs. The CPU 72 calculates the sulfur deposition amount Qs through a process that integrates a value obtained by multiplying the request injection amount Qd by a predetermined factor. The CPU 72 acquires the maximum value Cmax at the reference temperature, a length Lud from an upstream side to a downstream side, and a support amount Qpm of a noble metal as specification variables, that is, the state variables of the upstream catalyst 32 indicating the specifications. This is a setting for calculating the deterioration level of the upstream catalyst 32 having various specifications using single map data.

When step S90 is executed, the CPU 72 operates the communication device 79 to transmit the data acquired in step S90 to the center 120, together with a vehicle ID, that is, identification information of the vehicle VC (S92).

As illustrated in (b) in FIG. 14, the CPU 122 of the center 120 receives the transmitted data (S96), and assigns the data acquired by step S90 to the input variable x of the mapping (S12d). Here, in addition to step S12, when m=1 to sn, the CPU 122 assigns an increase amount average value Qiave (m) to an input variable x (6sn+m), assigns an ignition timing average value aigave (m) to an input variable x (7sn+m), and assigns an EGR rate average value Regrave (m) to an input variable x (8sn+m). In addition, the CPU 122 assigns an overlap average value ROave (m) to an input variable x (9sn+m), and assigns an injection division ratio average value Kpave (m) to an input variable x (10sn+m). The CPU 122 assigns the alcohol concentration Dal to an input variable x (11sn+1), assigns the atmospheric pressure Pa to an input variable x (11sn+2), assigns the ambient temperature TO to an input variable x (11sn+3), and assigns the sulfur deposition amount Qs to an input variable x (11sn+4). The CPU 122 assigns the maximum value Cmax to an input variable x (11sn+5), assigns the length Lud to an input variable x (11sn+6), and assigns the support amount Qpm to an input variable x (11sn+7).

Then, the CPU 122 calculates the deterioration level variable Rd by inputting the input variables x (1) to x (11sn+7) generated by S12d to a mapping that is specified by the map data 126a (S14d). A factor wji of the input of the mapping that is specified by the map data 126a is where "i=0 to 11sn+7".

Then, the CPU 122 operates the communication device 129 to transmit a signal related to the deterioration level variable Rd to the vehicle VC from which the data is received in step S96 (S98). As illustrated in (a) in FIG. 14, the CPU 72 receives the deterioration level variable Rd (S94), and executes steps S16 to S24.

As illustrated in (b) in FIG. 14, the CPU 122 updates the deterioration level variable Rd related to the vehicle specified by the vehicle ID (S100) in state information data 126b that is stored in the storage device 126 illustrated in FIG. 13.

The CPU 122 determines whether or not the terminal 130 of the used vehicle dealer sends a request for vehicle state information such as the deterioration level variable Rd related to a specified vehicle (S102). When it is determined that the request is received (S102: YES), the CPU 122 accesses the storage device 126 to search for the deterioration level variable Rd corresponding to the vehicle ID (S104). Then, the CPU 122 operates the communication device 129 to output, for example, the deterioration level variable Rd corresponding to the requested vehicle ID to the terminal 130 as state information of the used vehicle (S106).

When step S106 is completed or when it is determined in step S102 that the request is not received, the CPU 122 temporarily ends the process illustrated in (b) in FIG. 14. Steps S96 to S98 are specified in the deterioration detection main program 124a. Steps S100 to S106 are specified in the state information provision program 124b.

As described above, in the present embodiment, since the deterioration level variable Rd is calculated in the center 120, the computational load of the CPU 72 is reduced.

In addition, in the present embodiment, the deterioration level variable Rd is stored and updated together with the vehicle ID in the center 120. Thus, when a vehicle specified by the vehicle ID is sent to the used vehicle dealer and the used vehicle dealer sells the vehicle as a used vehicle, the used vehicle dealer is provided with the deterioration level variable Rd as state information indicating the state of the used vehicle. Therefore, a customer who considers purchasing the used vehicle is able to obtain detailed information regarding the deterioration level of the vehicle that the customer considers purchasing.

Correspondence Relationship

The correspondence relationships between the items in the above-described embodiments and the items described in the section titled "Summary" are as follows. Hereinafter, the correspondence relationship is shown with the numeral of each aspect described in the section titled "Summary."

[1 to 4] The execution device, namely, the processing circuitry, corresponds to the CPU 72 and the ROM 74. The first predetermined period and the second predetermined period correspond to the periods in which the upstream average values Afuave (1) to Afuave (sn) are sampled. The acquisition process corresponds to steps S10 and S10c. The deterioration level variable calculation process corresponds to steps S12 and S14; steps S12a, S14a, and S52; steps S12b and S14b; and steps S12c and S14c. The dealing process corresponds to step S18 and the process illustrated in FIG. 4. The time series data related to the excess amount variable corresponds to the time series data of each of the upstream average value Afuave, the rotational speed NE, and the charging efficiency η in the process illustrated in FIG. 3. The downstream detection variable corresponds to the time series data of the downstream average value Afdave.

[5] The selection process corresponds to step S62 and steps S70 to S78.

[6 and 7] The process corresponds to step S62.

[8] The process corresponds to the process illustrated in FIG. 10.

[9] The predetermined condition corresponds to the conditions (A) and (B) in step S80.

[10] The predetermined condition corresponds to the condition (C) in step S80.

[11] The predetermined condition corresponds to a condition that is determined in step S82 whether or not the condition is satisfied.

[12] The limiting process corresponds to steps S34 and S36. More specifically, the limiting process corresponds to, for example, a process that operates the inverters 58 and 60, which are predetermined hardware, to increase the output of the motor-generators 52 and 54 so that the internal combustion engine 10 is set to the stop state.

[13] The catalyst deterioration detection system corresponds to the control device 70 and the center 120. The value corresponding to the oxygen storage amount corresponds to the deterioration level variable Rd. The first execution device corresponds to the CPU 72 and the ROM 74. The second execution device corresponds to the CPU 122 and the ROM 124. The acquisition process corresponds to step S90. The vehicle side transmission process corresponds to step S92. The vehicle side reception process corresponds to step S94. The outside reception process corresponds to step S96. The oxygen storage amount calculation process corresponds to steps S12*d* and S14*d*. The vehicle side transmission process corresponds to step S98.

[14] The data analysis device corresponds to the center 120.

[15] The control device of the internal combustion engine corresponds to the control device 70.

[16] The acquisition process corresponds to step S90. The deterioration level variable calculation process corresponds to steps S12*d* and S14*d*. The storage process corresponds to step S100. The output process corresponds to step S106. The computer corresponds to the CPUs 72 and 122 and ROMs 74 and 124.

Other Embodiments

These embodiments can be implemented with the following modifications. The combinations of these embodiments and the following modification examples can be made and implemented without departing from the technical scope.

First Predetermined Period and Second Predetermined Period

In the above-described configuration, the first predetermined period, which is the sampling period of the time series data of the upstream average value Afuave, and the second predetermined period, which is the sampling period of the time series data of the downstream average value Afdave, are set to the same period. However, the first predetermined period and the second predetermined period are not limited to being the same period. For example, the second predetermined period may be a period that is slightly delayed in relation to the first predetermined period. In this case, when the flow rate of the fluid flowing into the upstream catalyst 32 is large, the delay time of the second predetermined period in relation to the first predetermined period may be shortened as compared to when the flow rate of the fluid is small. However, the delay time may be a fixed value to reduce the number of man-hours for performing the adaptation.

In addition, the length of the first predetermined period does not necessarily have to be the same as the length of the second predetermined period.

Time Series Data of Excess Amount Variable

The time series data of the excess amount variable is not limited to those provided as examples in the above-described embodiments. More specifically, the time series data of the excess amount variable is not limited to a data set of the three state variables, that is, the upstream average value Afuave, the rotational speed NE, and the charging efficiency η where the number of samplings is the same, or a data set of time series data of the upstream average value Afuave, the rotational speed NE, and the charging efficiency η where the number of samplings of the rotational speed NE and the charging efficiency η is less than that of the upstream average value Afuave. For example, in the cases of the above-described embodiments, without including the rotational speed NE and the charging efficiency η in the input to the mapping, the in-catalyst flow rate CF may be regarded as a variable that determines the flow rate of the fluid flowing into the upstream catalyst 32. Alternatively, for example, the intake air amount Ga may be used as a variable that determines the flow rate of the fluid flowing into the upstream catalyst 32 and is included in the time series data of the excess amount variable.

For example, the time series data of the excess amount variable may be configured by the time series data of the upstream average value Afuave in the predetermined period and a single piece of data of a variable in the predetermined period that determines the flow rate of the fluid flowing into the upstream catalyst 32. More specifically, for example, the time series data of the excess amount variable may be the time series data of the upstream average value Afuave in the predetermined period and a single set of the rotational speed NE and the charging efficiency η in the predetermined period. In this case, the rotational speed NE and the charging efficiency η are variables that determine the flow rate of the fluid flowing into the upstream catalyst 32 in the predetermined period corresponding to the time series data of the upstream average value Afuave. It is assumed that a change in the flow rate in the predetermined period is negligible.

The time series data related to the excess amount variable is not limited to the time series data of the upstream average value Afuave. For example, when shortening the sampling time interval of the upstream detection value Afu, the time series data of the upstream detection value Afu may be used as the time series data related to the excess amount variable.

Furthermore, the excess amount variable is not limited to the data related to the upstream detection value Afu. For example, the integrated value of the request injection amount Qd in the time series data sampling interval and the time series data of the intake air amount Ga may be used. In addition, for example, the increase amount Qi and the rotational speed NE may be used.

Downstream Detection Variable

The input to the mapping may be the time series data of the downstream detection value Afd instead of the time series data of the downstream average value Afdave.

In-Catalyst Flow Rate CF

The input to the mapping may be a single sampling value of the in-catalyst flow rate CF instead of the time series data of the in-catalyst flow rate CF.

In the above-described embodiments, the in-catalyst flow rate CF is calculated from the rotational speed NE and the charging efficiency η. However, the in-catalyst flow rate CF is not limited to being calculated therefrom. For example, a pressure sensor and a temperature sensor may be provided upstream of the upstream catalyst 32 in the exhaust passage 30 in the proximity of the upstream catalyst 32, and the in-catalyst flow rate CF may be calculated based on values from these sensors and the intake air amount Ga.

Catalyst Temperature

The input to the mapping may be a single sampling value of the catalyst temperature Tcat instead of the time series data of the catalyst temperature Tcat or the time series data of the catalyst temperature average value Tcatave.

In addition, for example, the catalyst temperature Tcat may be omitted from the input to the mapping. Instead, all the inputs of the catalyst temperature calculation process M22 may be input to the same mapping. With this configuration, the deterioration level variable Rd is also calculated with high accuracy, for example, by increasing the number of the intermediate layers.

Input to Mapping

In the input to the mapping of the above-described embodiment, the set of the rotational speed NE and the charging efficiency η is used as the operating point variables that specify the operating points of the internal combustion engine 10. Instead, for example, the intake air amount Ga and the rotational speed NE may be used as the operating point variables. In addition, for example, as described below in the section titled "Internal Combustion Engine," in a case in which the present disclosure is applied to a compression ignition internal combustion engine, the rotational speed NE and the injection amount or the rotational speed NE and the accelerator pedal operating amount ACCP may be used as the operating point variables. However, the operating point variables do not necessarily have to be included in the input to the mapping.

In the input to the mapping provided as an example in the process illustrated in FIG. 14, step S14d does not necessarily have to be executed in the center 120. In other words, steps S12d and S14d may be executed in the control device 70.

The input variables provided as examples in step S14d may be changed, for example, as follows.

For example, instead of using the time series data of the increase amount average value Qiave, the time series data of the increase amount Qi may be used. The input variable is not limited to the increase amount Qi or the increase amount average value Qiave. For example, the time series data of an excess rate that is obtained by dividing the increase amount Qi by the base injection amount Qb, the time series data of the average value of the excess rates, or the time series data of the request injection amount Qd or the average value of the request injection amounts Qd may be used. In this case, the number of samplings of the time series data that is input to the mapping does not necessarily have to be the same as the number of samplings of the downstream average value Afdave. Instead of using the time series data, a single sampling value of the increase amount Qi, the excess rate, or the request injection amount Qd in the predetermined period may be used. Instead of using the time series data, a single sampling value of the increase amount average value Qiave, the average value of the excess rates, or the average value of the request injection amounts Qd in the predetermined period may be used. In this case, the average value may be an average value over the predetermined period. The above-described variables related to the injection amount do not necessarily have to be included in the input to the mapping in processes such as the process illustrated in (b) in FIG. 14.

In addition, for example, instead of using the time series data of the ignition timing average value aigave, the time series data of the ignition timing aig may be used. In addition, the ignition timing average value aigave and the ignition timing aig are not limited to the time series data. A single sampling value of the ignition timing aig or a single sampling value of the ignition timing average value aigave in the predetermined period may be used. In this case, the ignition timing average value aigave may be an average value obtained over the predetermined period. These variables related to the ignition timing aig do not necessarily have to be included in the input to the mapping in processes such as the process illustrated in (b) in FIG. 14.

In addition, for example, instead of using the time series data of the EGR rate average value Regrave, the time series data of the EGR rate Regr itself may be used. In addition, the EGR rate Regr and the EGR rate average value Regrave are not limited to the time series data. A single sampling value of the EGR rate Regr or a single sampling value of the EGR rate average value Regrave in the predetermined period may be used. In this case, the EGR rate average value Regrave may be an average value obtained over the predetermined period. These variables related to the EGR rate Regr do not necessarily have to be included in the input to the mapping in processes such as the process illustrated in (b) in FIG. 14.

In addition, for example, instead of using the time series data of the overlap average value ROave, the time series data of the overlap RO may be used. The overlap average value ROave and the overlap RO are not limited to the time series data. A single sampling value of the overlap RO or a single sampling value of the overlap average value ROave in the predetermined period may be used. In this case, the overlap average value ROave may be an average value obtained over the predetermined period. A data set of the valve opening timing of the intake valve 18 and the valve opening timing of the exhaust valve 28 may be used as a variable related to the overlap. These variables related to the overlap RO do not necessarily have to be included in the input to the mapping in processes such as the process illustrated in (b) in FIG. 14.

In addition, for example, instead of the time series data of the injection division ratio average value Kpave, the time series data of the injection division ratio Kp itself may be used. In addition, the injection division ratio average value Kpave and the injection division ratio Kp are not limited to the time series data, and a single sampling value of the injection division ratio Kp or a single sampling value of the injection division ratio average value Kpave in the predetermined period may be used. In this case, the injection division ratio average value Kpave may be an average value over the predetermined period. The variables related to the injection division ratio Kp do not necessarily have to be included in the input to the mapping in processes such as the process illustrated in (b) in FIG. 14.

In addition, for example, instead of using the alcohol concentration Dal, the average value of the alcohol concentrations Dal in the predetermined period may be used. The time series data of the alcohol concentration Dal or the time series data of the average value of the alcohol concentrations Dal in the predetermined period may be used. A fuel property variable, that is, a variable indicating the properties of the fuel, is not limited to a stoichiometric air-fuel ratio variable indicating the difference of the stoichiometric air-fuel ratio of the fuel such as the alcohol concentration Dal. The fuel property variable may be, for example, a variable indicating whether the fuel is a heavy fuel or a light fuel. The fuel property variable does not necessarily have to be included in the input to the mapping in processes such as the process illustrated in (b) in FIG. 14.

In addition, for example, instead of using the atmospheric pressure Pa, the average value of the atmospheric pressure Pa in the predetermined period may be used. The time series data of the atmospheric pressure Pa or the time series data of the average value of the atmospheric pressure Pa in the predetermined period may be used. The variables related to the atmospheric pressure Pa do not necessarily have to be included in the input to the mapping in processes such as the process illustrated in (b) in FIG. 14.

In addition, for example, instead of using the ambient temperature TO, the average value of the ambient temperatures TO in the predetermined period may be used. The time series data of the ambient temperature TO or the time series data of the average value of the ambient temperatures TO in the predetermined period may be used. The variables related to the ambient temperature TO do not necessarily have to be included in the input to the mapping in processes such as the process illustrated in (b) in FIG. 14.

In addition, for example, instead of using the sulfur deposition amount Qs, the average value of the sulfur deposition amounts Qs in the predetermined period may be used. The time series data of the sulfur deposition amount Qs or the time series data of the average value of the sulfur deposition amounts Qs in the predetermined period may be used. The variables related to the sulfur deposition amount Qs do not necessarily have to be included in the input to the mapping in processes such as the processes illustrated in (b) in FIG. 14.

The specification variables determining the specifications of the upstream catalyst 32 are not limited to the three variables, namely, the maximum value Cmax, the length Lud from upstream to downstream, and the support amount Qpm. For example, only one or two of the three parameters may be used. The specification variables do not necessarily have to be included in the input to the mapping in processes such as the process illustrated in (b) in FIG. 14.

For example, as described below in the section titled "Internal Combustion Engine," in a case in which the internal combustion engine 10 includes a turbocharger and a wastegate valve, the opening degree of the wastegate valve may be included in the input to the mapping. More specifically, the flow of the fluid to the upstream catalyst 32 changes in accordance with the opening degree of the wastegate valve and thus affects consumption of the stored oxygen. Such a situation is learned, when the opening degree is included in the input to the mapping.

The cases in which the variables related to the flow rate of the fluid flowing into the upstream catalyst 32 are not input to the mapping are not limited to those provided as examples in the above-described embodiments. For example, in a case in which the internal combustion engine is installed in a series hybrid vehicle such as that described below in the section titled "Vehicle" is driven only at predetermined operating points, the variables related to the flow rate of the fluid flowing into the upstream catalyst 32 do not have to be input to the mapping. For example, as described below in the section titled "Sampling Period of Time Series Data," in a case in which the process that changes the target value Af* for the calculation of the deterioration level variable Rd is executed only at predetermined operating points, the variables related to the flow rate of the fluid flowing into the upstream catalyst 32 do not have to be input to the mapping.

The input to the neural network and the input to the regression equation, which are described below in the section titled "Algorithm of Machine Learning," are not limited to being formed of physical quantities each having a single dimension. For example, in the above-described embodiments, different kinds of the physical quantities that are input to the mapping and are directly input to the neural network or the regression equation. Instead, one or more of the different kinds of the physical quantities may be analyzed for their main components, and the main components may be directly input to the neural network or the regression equation. However, in a case in which main components are input to the neural network or the regression equation, the main components do not necessarily have to be only a portion of the input to the neural network or the regression equation. The entirety of the input may be the main components. In a case in which the main components are input to the mapping, the map data 76*a* and 126*a* include data that specifies a mapping that determines the main components.

Map Data

For example, the illustrations in FIG. 11 indicate that the number of the intermediate layers of the neural network is greater than two. However, the number of intermediate layers is not limited to being greater than two. In particular, from the viewpoint of reducing the computational load of the control device 70, the number of intermediate layers of the neural network may be reduced to one or two. Such a configuration is readily implemented, for example, when the processes illustrated in FIGS. 9 to 12 are executed, as compared to when the process illustrated in FIG. 14 is executed.

In the above-described embodiments, the activation functions h1, h2, . . . , and hα are hyperbolic tangents and the activation function f is a ReLU. However, the present disclosure is not limited to such a configuration. For example, each of the activation functions h1, h2, . . . , and hα may be a ReLU. For example, the activation functions h1, h2, . . . , and hα may be logistic sigmoid functions. For example, the activation function f may be a logistic sigmoid function.

Different Kinds of Map Data

In the process illustrated in FIG. 9, the rotational speed NE and the charging efficiency η are used as the variables related to the flow rate of the fluid flowing into the upstream catalyst 32, and different pieces of map data are used for each of the areas divided by the rotational speed NE and the charging efficiency η. However, the variables related to the flow rate of the fluid flowing into the upstream catalyst 32 are not limited thereto. For example, the intake air amount Ga or the in-catalyst flow rate CF may be used.

In the process illustrated in FIG. 9, different pieces of map data are used for each of the areas divided by the variables related to the flow rate of the fluid flowing into the upstream catalyst 32 and the catalyst temperature Tcat. However, the present disclosure is not limited to the configuration described above. For example, regardless of the catalyst temperature Tcat, different pieces of map data may be used for each of areas that are divided by the variables related to the flow rate of the fluid flowing into the upstream catalyst 32. In addition, for example, regardless of the variables related to the flow rate of the fluid flowing into the upstream catalyst 32, different pieces of map data may be used for each of areas that are divided by the catalyst temperature Tcat.

In the process illustrated in FIG. 10, when a negative determination is made in S72, different pieces of map data may be used for each of areas that are divided by the variables related to the flow rate of the fluid flowing into the upstream catalyst 32. Alternatively, for example, when a negative determination is made in S72, different pieces of map data may be used for each of areas that are divided by the catalyst temperature Tcat. For example, when a negative determination is made in S72, different pieces of map data may be used for each of areas that are divided by the variables related to the flow rate of the fluid flowing into the upstream catalyst 32 and the catalyst temperature Tcat.

The input of the map data corresponding to a case in which different kinds of map data are provided is not limited to those provided as examples in the above-described embodiments. For example, regardless of the variables related to the flow rate of the fluid flowing into the upstream catalyst 32, when different pieces of map data are used for each of the areas that are divided by the catalyst temperature Tcat, the input to the mapping may include the variables related to the flow rate of the fluid flowing into the upstream catalyst 32. In addition, for example, regardless of the catalyst temperature Tcat, when different pieces of map data are used for each of areas that are divided by the variables related to the flow rate of the fluid flowing into the upstream catalyst 32, the input to the mapping may include the catalyst temperature Tcat. The configuration that does not include the variables used to divide the areas in the input to the mapping is not necessary. For example, in a case in which different pieces of map data are used for each of areas that are divided by the variables related to the flow rate of the fluid flowing into the upstream catalyst 32 and the catalyst temperature Tcat, the input to the mapping may include the variables related to the flow rate of the fluid flowing to the upstream catalyst 32 and the catalyst temperature Tcat. Furthermore, the input to the mapping may also include, for example, variables that do not directly determine the division of an area such as the increase amount average value Qiave.

Predetermined Conditions

In step S80 illustrated in FIG. 11, the condition indicating that the flow rate of the fluid flowing into the upstream catalyst 32 is within a predetermined range is a condition indicating that the logical product of the condition (A) and the condition (B) is true. However, the present disclosure is not limited to such a configuration. For example, a condition indicating that the intake air amount Ga or the in-catalyst flow rate CF is within a predetermined range may be used.

In step S80 illustrated in FIG. 11, the predetermined condition for the sampling of the variables used in calculating the deterioration level variable Rd is a condition indicating that the logical product of the condition indicating that the flow rate of the fluid flowing into the upstream catalyst 32 is within the predetermined range and the condition (C) is true. However, the present disclosure is not limited to such a configuration. A condition indicating that only either one of the two conditions is satisfied may be used.

The input of the map data in the process illustrated in FIG. 11 and its modification examples is not limited to those provided as examples in the above-described embodiments. For example, regardless of the variables related to the flow rate of the fluid flowing into the upstream catalyst 32, when the catalyst temperature Tcat is within the predetermined range, in a case in which the sampling of the variables used in calculating the deterioration level variable Rd is allowed, the input to the mapping may include the variables related to the flow rate of the fluid flowing into the upstream catalyst 32. In addition, for example, regardless of the catalyst temperature Tcat, when the flow rate of the fluid flowing into the upstream catalyst 32 is within the predetermined range, in a case in which the sampling of the variables used in calculating the deterioration level variable Rd is allowed, the input to the mapping may include the catalyst temperature Tcat. The configuration that does not include the variables that are included in the condition that allows the sampling of the variables used in calculating the deterioration level variable Rd in the input to the mapping. For example, when the logical product of the above-described conditions (A) to (C) is true, in a case in which the sampling of the variables which are used in calculating the deterioration level variable Rd is allowed, the input to the mapping includes the variables related to the flow rate of the fluid flowing into the upstream catalyst 32 and the catalyst temperature Tcat. Furthermore, the input to the mapping may also include, for example, variables that do not directly determine the condition that allows the sampling of the variables used to calculate the deterioration level variable Rd, such as the increase amount average value Qiave.

In step S82 illustrated in FIG. 12, the predetermined condition for the sampling of the variables which is used to calculate the deterioration level variable Rd is a condition indicating that the logical sum of the condition (D) and the condition (E) is true. However, the present disclosure is not limited to such a configuration. For example, a condition indicating that the condition (D) is satisfied may be used.

Sampling Period of Time Series Data

In the above-described embodiments, when the target value Af* is set as described above, time series data that is input to the mapping is sampled. However, the present disclosure is not limited to such a configuration. For example, the target value Af* may be set for the calculation of the deterioration level variable Rd. Also, in this case, when the time series data provided as examples in the above-described embodiments are used, the target value Af* may be set to further reduce the amount of deviation of the composition of the fluid flowing into the catalyst from the composition that is appropriate for the purification performance of the catalyst and to further shorten a period in which the amount of deviation increases, as compared to a case in which the technique in the related art is used.

Dealing Process

The notification process is not limited to operating a device that outputs visual information such as the warning lamp 99. The notification process may be, for example, a process that operates a device that outputs voice information.

The dealing process is not limited to performing all of steps S34, S36, and S38. Among the three steps, only one step may be performed. Alternatively, for example, only two of the three steps may be performed. Without executing the process illustrated in FIG. 4, only step S18 may be executed.

In addition, for example, when heating control such as a sulfur deposition removal process is performed on the upstream catalyst 32, the operating amount of the heating control may be changed in accordance with the deterioration level of the upstream catalyst 32. In this case, in a case in which the same operating amount is set for when the deterioration level is high and when the deterioration level is low, since the temperature rise speed is lower when the deterioration level is high, the operating amount basically may be changed to increase the temperature rise speed.

Machine Learning Algorithm

An algorithm of machine learning is not limited to a neural network. For example, a regression equation may be used. This is equivalent to a case in which intermediate layers are not provided in the above-described neural network.

Map Data Generation

In the above-described embodiments, the data acquired when the internal combustion engine 10 operates in a state where the dynamometer 100 is connected to the crankshaft 26 is used as training data. However, the present disclosure is not limited to such a configuration. For example, data that is acquired when the internal combustion engine 10 is driven in a state where the internal combustion engine 10 is installed in the vehicle VC may be used as training data.

Data Analysis Device

Instead of steps S12*d* and S14*d*, the center 120 may execute the process that calculates the maximum value Cmax, and may transmit the maximum value Cmax to the vehicle VC as in steps S12*a* and S14*a*.

The center 120 may execute steps S16 and S18, and may execute, as step S18, a process that notifies a mobile terminal of a user that there is an abnormality.

Steps S96, S12*d*, S14*d*, and S98 illustrated in (b) in FIG. 14 may be executed, for example, by the mobile terminal held by the user.

Execution Device

The execution device is not limited to including the CPU 72 (CPU 122) and the ROM 74 (ROM 124), and executing software processes by using the CPU 72 (CPU 122) and the ROM 74 (ROM 124). For example, the execution device may include a dedicated hardware circuit (for example, ASIC) that processes at least some of the software processes executed in the above-described embodiments. More specifically, the execution device may have any one of the following configurations (a) to (c). Configuration (a) includes a processing device that executes all of the above-described processes according to a program and a program storage device such as a ROM that stores the program. Configuration (b) includes a processing device that executes some of the above-described processes according to a program, a program storage device, and a dedicated hardware circuit that executes the remaining processes. Configuration (c) includes a dedicated hardware circuit that executes all of the above-described processes. A plurality of software execution devices, each of which includes the processing device and the program storage device, may be provided. A plurality of dedicated hardware circuits may be provided. More specifically, the above-described processes may be executed by processing circuitry including at least one of one or more of software execution devices and one or more of dedicated hardware circuits. The program storage device, namely, a computer readable medium includes all useable media that can be accessed by general-purpose or dedicated computers.

Storage Device

In the above-described embodiments, the storage devices that store the map data 76a and 126a are configured to be separate from the storage devices (ROM 74 and ROM 124) that store the deterioration detection program 74a and the deterioration detection main program 124a. However, the storage devices are not limited to such a configuration.

State Information Providing Process

In the process illustrated in FIG. 14, steps S12d and S14d are performed in the center 120. However, the present disclosure is not limited to such a configuration. Steps S12d and S14d may be performed by the control device 70. In this case, the control device 70 may output the deterioration level variable Rd to the center 120, together with the vehicle ID, and the center 120 may execute the steps following S100. In that case, whenever the control device 70 calculates the deterioration level variable Rd, the control device 70 does not necessarily have to output the deterioration level variable Rd to the center 120, together with the vehicle ID. For example, the deterioration level variable Rd may be registered to the center 120 when a used vehicle dealer purchases the vehicle VC as a used vehicle.

Internal Combustion Engine

The internal combustion engine is not limited to including both of the port injection valve 16 and the in-cylinder injection valve 22. The internal combustion engine may include only one of the two types of the fuel injection valves.

The internal combustion engine is not limited to a spark ignition internal combustion engine, and may be, for example, a compression ignition internal combustion engine that uses diesel as fuel.

Others

The vehicle is not limited to a series and parallel hybrid vehicle, and may be, for example, a series hybrid vehicle or a parallel hybrid vehicle. The vehicle is also not limited to a hybrid vehicle, and may be a vehicle that includes only the internal combustion engine as a device that generates propulsion power of the vehicle.

The catalyst is not limited to a three-way catalyst, and may have, for example, a configuration where a three-way catalyst is supported on a filter that captures particulate matter.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst deterioration detection device configured to detect a deterioration of a catalyst provided in an exhaust passage of an internal combustion engine, the catalyst deterioration detection device, comprising:
a storage device; and
processing circuitry, wherein
the storage device stores map data, the map data specifying a mapping that uses a series of data of an excess amount variable taken during a first predetermined period and a series of data of a downstream detection variable taken during a second predetermined period as inputs to output a deterioration level variable,
an amount of fuel that reacts with oxygen contained in a fluid flowing into the catalyst without excess or deficiency is an ideal fuel amount, and the excess amount variable is a variable that corresponds to an excess amount of an actual fuel flowing into the catalyst in relation to the ideal fuel amount,
the downstream detection variable is a variable that corresponds to a detection value of an air-fuel ratio sensor provided downstream of the catalyst,
the deterioration level variable is a variable related to a deterioration level of the catalyst,
the processing circuitry is configured to execute
an acquisition process that acquires the series of data of the excess amount variable during the first predetermined period and the series of data of the downstream detection variable during the second predetermined period,
a deterioration level variable calculation process that calculates the deterioration level variable of the catalyst based on an output of the mapping using the data acquired by the acquisition process as an input, and
a dealing process that operates a predetermined hardware when the deterioration level of the catalyst is greater than or equal to a predetermined level based on a calculation result of the deterioration level variable calculation process in response to a situation in which the deterioration level of the catalyst is greater than or equal to the predetermined level.

2. The catalyst deterioration detection device according to claim 1, wherein the series of data taken during the second predetermined period includes values of the downstream detection variable that correspond to three or more different points in time.

3. The catalyst deterioration detection device according to claim 1, wherein
an input to the mapping includes a temperature of the catalyst, the acquisition process includes a process that acquires the temperature of the catalyst, and the deterioration level variable calculation process includes a process that calculates the deterioration level variable of the catalyst based on an output of the mapping that uses the temperature of the catalyst as an input.

4. The catalyst deterioration detection device according to claim 1, wherein the excess amount variable includes a variable that corresponds to a detection value of an air-fuel ratio sensor provided upstream of the catalyst.

5. The catalyst deterioration detection device according to claim 1, wherein the map data is one of different kinds of map data, and the storage device includes the different kinds of map data, and the deterioration level variable calculation process includes a selection process that selects the map data from the different kinds of map data, the map data being used to calculate the deterioration level variable of the catalyst.

6. The catalyst deterioration detection device according to claim 5, wherein the different kinds of map data include data for each of areas that are divided based on a flow rate of the fluid flowing into the catalyst, and the selection process includes a process that selects the map data used to calculate the deterioration level variable of the catalyst based on the flow rate.

7. The catalyst deterioration detection device according to claim 5, wherein the different kinds of map data include data for each of areas that are divided based on a temperature of the catalyst, and the selection process includes a process that selects the map data used to calculate the deterioration level of the catalyst based on the temperature of the catalyst.

8. The catalyst deterioration detection device according to claim 5, wherein the different kinds of map data include different pieces of data corresponding to whether a fuel cutoff process is being executed, and the selection process includes a process that selects the map data in accordance with whether or not the fuel cutoff process is being executed.

9. The catalyst deterioration detection device according to claim 1, wherein the acquisition process includes a process that acquires a variable that is used as an input to the mapping when a predetermined condition is satisfied, and the predetermined condition includes a condition indicating that a flow rate of the fluid flowing into the catalyst is within a predetermined range.

10. The catalyst deterioration detection device according to claim 1, wherein the acquisition process includes a process that acquires a variable that is used as an input to the mapping when a predetermined condition is satisfied, and the predetermined condition includes a condition indicating that a temperature of the catalyst is within a predetermined range.

11. The catalyst deterioration detection device according to claim 1, wherein the acquisition process includes a process that acquires a variable that is used as an input to the mapping in synchronization with a point in time at which a predetermined condition is satisfied, and the predetermined condition is a condition indicating that an amount of oxygen stored in the catalyst corresponds to a maximum value or a minimum value.

12. The catalyst deterioration detection device according to claim 1, wherein the dealing process includes a limiting process that limits an amount of unburned fuel flowing into the catalyst to a reduced amount.

13. A catalyst deterioration detection system, comprising:

the catalyst deterioration detection device according to claim 1, wherein the deterioration level variable calculation process includes an oxygen storage amount calculation process that uses at least a part of the map data to calculate a value corresponding to a maximum value of an oxygen storage amount of the catalyst, the processing circuitry includes a first execution device and a second execution device, the first execution device is installed in a vehicle and is configured to execute the acquisition process, a vehicle side transmission process that transmits data acquired by the acquisition process to an outside of the vehicle, a vehicle side reception process that receives a signal based on a calculation result of the oxygen storage amount calculation process, and the dealing process, and the second execution device is disposed outside the vehicle and is configured to execute an outside reception process that receives data transmitted by the vehicle side transmission process, the oxygen storage amount calculation process, and an outside transmission process that transmits a signal based on a calculation result of the oxygen storage amount calculation process to the vehicle.

14. A data analysis device, comprising:

the second execution device and the storage device according to claim 13.

15. A control device of an internal combustion engine, the control device, comprising:

the first execution device according to claim 13.

16. A method for providing state information of a used vehicle on which an internal combustion engine is mounted, the internal combustion engine being provided with a catalyst provided in an exhaust passage, the method causing a computer to execute:

an acquisition process that acquires a series of data of an excess amount variable taken during a first predetermined period and a series of data of a downstream detection variable taken during a second predetermined period, wherein the excess amount variable is a variable that corresponds to an excess amount of an actual fuel flowing into the catalyst in relation to an ideal fuel amount, and the downstream detection variable is a variable that corresponds to a detection value of an air-fuel ratio sensor provided downstream of the catalyst, a deterioration level variable calculation process that calculates a deterioration level variable of the catalyst based on an output of a mapping using the data acquired by an acquisition process as an input, a storage process that stores a calculation result of the deterioration level variable calculation process together with a vehicle ID in a storage device, and an output process that outputs deterioration level information of the catalyst corresponding to the vehicle ID in response to an access from outside.

* * * * *